United States Patent
Han

(10) Patent No.: US 11,111,898 B2
(45) Date of Patent: Sep. 7, 2021

(54) VOLTAGE CONVERTER-CONTROLLED DAMLESS HYDROKINETIC RIVER TURBINES

(71) Applicant: Differential Dynamics Corporation, Owings Mills, MD (US)

(72) Inventor: Kyung Soo Han, Timonium, MD (US)

(73) Assignee: Differential Dynamics Corporation, Owning Mills, MD (US)

( * ) Notice: Subject to any disclaimer, the term of this patent is extended or adjusted under 35 U.S.C. 154(b) by 0 days.

(21) Appl. No.: 17/012,426

(22) Filed: Sep. 4, 2020

(65) Prior Publication Data

US 2021/0180559 A1 Jun. 17, 2021

Related U.S. Application Data

(63) Continuation-in-part of application No. 16/691,145, filed on Dec. 11, 2019, now Pat. No. 10,941,749, which is a continuation-in-part of application No. 16/233,365, filed on Dec. 27, 2018, now Pat. No. 10,947,956, which is a continuation-in-part of application No. 16/134,595, filed on Sep. 18, 2018, now Pat. No. 10,982,645, which is a continuation-in-part of application No. 15/883,927, filed on Jan. 30, 2018, now Pat. No. 10,670,116, which is a continuation-in-part of application No. 15/267,655, filed on Sep. 16, 2016, now Pat. No. 9,912,209, which is a continuation-in-part of (Continued)

(51) Int. Cl.
| F03B 17/06 | (2006.01) |
| F03B 7/00 | (2006.01) |
| F03B 15/12 | (2006.01) |

(52) U.S. Cl.
CPC .......... *F03B 17/061* (2013.01); *F03B 7/006* (2013.01); *F03B 15/12* (2013.01)

(58) Field of Classification Search
CPC ........ F03B 17/061; F03B 15/12; F03B 7/006
USPC .......................... 290/42, 43, 44, 53, 54, 55
See application file for complete search history.

(56) References Cited

U.S. PATENT DOCUMENTS

| 4,261,171 A * | 4/1981 | Atencio ................ F03B 13/268 60/398 |
| 4,279,539 A * | 7/1981 | Gutierrez Atencio .... E02B 9/00 405/76 |

(Continued)

*Primary Examiner* — Charles Reid, Jr.
(74) *Attorney, Agent, or Firm* — Cameron LLP

(57) ABSTRACT

A river, tidal, wave or ocean current or a wind turbine for generating electricity harnesses a predetermined minimum or baseload value of hydrokinetic/wind energy from variable water/wind flow. A harnessing module may have a waterwheel or propeller and a-generator or a waterwheel or propeller alone. A harnessing module harnesses wind or water energy and may be connected to a land module of electrical and mechanical apparatus by an electrical cable. Received variable electrical input from the harnessing module is converted to a-constant electrical frequency by a connected generator feeding a grid, for example, using a Hummingbird speed converter. The received variable electrical load power may be mechanically corrected by feedback to a Kingfisher converter. An output generator to output constant frequency may use a voltage regulator, a variable voltage transformer and a control motor to provide feed forward control.

17 Claims, 25 Drawing Sheets

Related U.S. Application Data application No. 14/838,867, filed on Aug. 28, 2015, now Pat. No. 9,476,401, application No. 17/012,426, which is a continuation-in-part of application No. 16/701,741, filed on Dec. 3, 2019, now Pat. No. 10,815,968, said application No. 16/134,595 is a continuation-in-part of application No. 15/707,138, filed on Sep. 18, 2017, now Pat. No. 10,378,506.

(60) Provisional application No. 62/409,549, filed on Oct. 18, 2016, provisional application No. 62/487,101, filed on Apr. 19, 2017, provisional application No. 62/520,884, filed on Jun. 16, 2017, provisional application No. 63/063,522, filed on Aug. 10, 2020.

(56) References Cited

U.S. PATENT DOCUMENTS

| | | |
|---|---|---|
| 4,280,061 A * | 7/1981 | Lawson-Tancred ...... F03D 9/25 290/55 |
| 8,388,481 B2 | 3/2013 | Han |
| 8,641,570 B2 | 2/2014 | Han |
| 8,702,552 B2 | 4/2014 | Han |
| 9,912,209 B2 | 3/2018 | Han |
| 10,815,968 B2 | 10/2020 | Han |
| 2020/0191120 A1 | 6/2020 | Han |

* cited by examiner

| Generator Speed | Generator Generated |
|---|---|
| X rpm | 50 Hz |
| Y rpm | 60 Hz |
| Z rpm | 400 Hz |
| Constant Speed | Constant Frequency |

VOLTAGE CONVERTER-CONTROLLED DAMLESS HYDROKINETIC RIVER TURBINES

This application is a continuation-in-part of U.S. patent application Ser. No. 16/691,145 filed Nov. 21, 2019 which is a continuation-in-part of U.S. patent application Ser. No. 16/233,365 filed Dec. 27, 2018 which is a continuation-in-part of U.S. patent application Ser. No. 16/134,595 filed Sep. 18, 2018 which is a continuation-in-part of U.S. patent application Ser. No. 15/883,927 filed Jan. 30, 2018 (now U.S. Pat. No. 10,670,116 issued Jun. 2, 2020), which is a continuation-in-part of U.S. patent application Ser. No. 15/267,655, filed Sep. 16, 2016, (now U.S. Pat. No. 9,912,209 issued Mar. 6, 2018) which is a continuation-in-part of U.S. patent application Ser. No. 14/838,867 filed on Aug. 28, 2015 (now U.S. Pat. No. 9,476,401 issued Oct. 25, 2016), and is a continuation-in-part of U.S. patent application Ser. No. 16/701,741 filed Dec. 3, 2019, and U.S. patent application Ser. No. 16/134,595 is also a continuation-in-part of U.S. patent application Ser. No. 15/707,138 filed on Sep. 18, 2017, (now U.S. Pat. No. 10,378,506 issued Aug. 13, 2019), which claims the right of priority to U.S. Provisional Patent Application Ser. No. 62/409,549 filed Oct. 18, 2016 of the same title and inventor, and U.S. patent application Ser. No. 15/883,927 claims the benefit of priority to U.S. Provisional Patent Application Ser. No. 62/487,101 filed Apr. 19, 2017 and to U.S. Provisional Patent Application Ser. No. 62/520,884 filed Jun. 16, 2017, and this application claims the right of priority to U.S. Provisional Patent Application Ser. No. 63/063,522 filed Aug. 10, 2020; all patent applications of the same inventor and incorporated by reference in their entirety.

TECHNICAL FIELD

The technical field of the invention relates to providing a method and apparatus for controlling the harnessing of renewable energy to a constant power value and constant frequency with a marine hydrokinetic (MHK) river, ocean or tidal turbine by balancing torque and rotational speed, or other renewable energy producing source (for example, wind) and for controlling other apparatus. A flexible electrical cable may feed generated electricity to a land-based power collection module outputting combined power from a plurality of renewable energy or other turbines to a grid via a constant frequency motor/generator set and a speed converter or a controlling and generating module. The flexible electric cable may connect the water (or land) based turbines to the land-based power collection module and controlling and generating module which may distribute power at constant frequency to the grid with feedforward and feedback control.

BACKGROUND OF THE INVENTION

Referring to prior art FIGS. 1A and 1B, motor generator sets (M-G sets) are known for residential and industrial use. Prior art FIG. 1A shows a known motor generator set 100 for industrial use. The motor 110 may selectively provide a constant rotational speed to a generator 120 and, per FIG. 1B, the generator 120 outputs electricity at a constant selected frequency. Such motor generator sets (M-G sets) may be used by homeowners to generate electricity during a power outage. Industrial motor generator sets can be larger and output greater power. The motor 110 may use gas or diesel fuel (residential use, for example) or may be driven by electricity (or fuel) in other applications with back-up generator use (such as using banks of batteries to run the motor during power outages). A principle of a known motor generator set is that the motor 110 is operated at constant speed to generate constant frequency electric power. Referring briefly to FIG. 1B, the generator 120 may be driven at varying rotational speed X, Y or Z rpm for, for example, different electrical frequency generator output. For example, the motor 110 may be selectively connected by gears to a rotating shaft (gears and shaft not shown) at X rpm to output at generator 120 a 50 Hz (European) alternating current. It may be that a rotational speed of X rpm of gears and a connecting shaft (not shown) is less than Y rpm which is less than Z rpm or may be geared to output 60 Hz (US) alternating current. A Z rotational speed of 400 Hz may be generated by outputting a rotational speed of Z rpm, the motor generator set selectively geared to output the desired constant 400 Hz electrical frequency.

FIG. 1C (prior art) shows, in summary, the concept of a motor generator set (M-G set) that a motor 110 may deliver a desired constant rotational speed by use of gears or a transformer (voltage-controlled) and a shaft to operate a generator 120 to receive the desired constant speed and output a desired constant electrical frequency. Note that a table of FIG. 1C introduces the concept of a constant input of constant power (mechanical in the form of a constant rotational speed input to generator 120 or in the form of a constant voltage input to motor 110. The constant speed output of motor 110 may be input by gears or a transformer and a shaft to a generator 120 which may selectively provide a constant electrical frequency output, for example, 50 Hz, 60 Hz or 400 Hz.

Prior art FIG. 2 shows what may be called a "motor equivalent" generator set (ME-G set) 200. Rather than a constant speed, a "motor equivalent" 210 may receive a variable power or rotational speed due to variations in water or wind flow and direction. Solar panels generate renewable energy when there is sun light and no electricity when there is no sun. For example, the motor equivalent 210 may be a renewable energy harnessing module such as a waterwheel or propeller (water or air) or a concentric wing driven by water at variable speed (because air or water are at variable speed and direction) or a solar panel. The "motor equivalent" 210 may comprise a harnessing module coupled with a speed converter to deliver constant speed so that the output of the generator 120 outputs at constant electrical frequency. The "motor equivalent" 210 converts variable power to a constant rotational speed to generator 120 which outputs electricity at constant frequency.

Referring to prior art FIG. 3, there is shown a pie chart from reference "Net Electricity Generation in the United States by Source (2016)". As can be seen from the summary Table, most electric power generation (ME-G set baseload 84% of power generation) comes from thermal turbines which can destroy the ozone layer (or in the case of nuclear reactors, cause nuclear accidents). In the U.S.A. in 2016, 30% or one-third of all electric energy is produced by steam generation using coal, 34% from natural gas and 20% from nuclear energy or about 85% including oil. In the Table under Renewables, hydroelectric and wind energy are two major sources of so-called renewable energy (ME-G sets generating baseload at about 6% each). A third source of renewable energy comes from the sun (solar panel energy at only 1.0%).

Water flows at variable speed and direction and so does wind. The sun only is bright enough during daytime hours for conversion to electrical energy. An advantage of water flow is the mass/density, inertia or power that may be generated by the flow of water compared with the flow of wind (wind amounts to 6% or renewable energy sources) where wind may be harnessed by large wind-driven propellers or rotor blades. Also, for example, river water typically flows at all hours of the day at a relatively constant rate of flow while wind energy and direction may vary from one minute to the next.

Natural gas provides the most baseload power or about 34% of all U.S. electric energy, and nuclear energy now provides about 20%, for example, via steam turbine generation. Petroleum, such as oil, is used to produce only about 1% of U.S. electric energy. Coal, natural gas, biomass and oil are carbon-based and when burned produce emissions which can be costly to mitigate or, if not mitigated, can be dangerous or at least increase the so-called carbon footprint in the earth's atmosphere. The supply of coal, natural gas and oil is also limited. Nuclear energy generation, unless handled with extreme care, is dangerous, and the spent nuclear fuel becomes a hazard to the world.

Renewable sources shown in FIG. 3 include geothermal, wind and solar energy. While these are "clean" sources, to date, their growth has been unimpressive. Only wind energy is supported by the Department of Energy, and wind energy is forecast to grow from 6% in 2015 to 20% of all US energy in approximately 20 years. Recently, offshore wind turbines have been considered for use off the Eastern Shore of the United States mounted on platforms for generating power for the mainland coastal states.

Consequently, the hope of electrical energy generation for the future is in so-called renewables which include, but are not limited to, the air (wind power), the sun (solar power) and water (hydroelectric and marine hydrokinetic (MHK) energy via river, ocean or tidal turbine) sources.

Referring to prior art FIG. 4, there is a diagram of a typical dam-based hydroelectric power plant 400. A dam is expensive to build (produces 6% of electric energy per FIG. 3) which may be considered an example of a motor equivalent generator set (ME-G set). A river flow 410 provides variable kinetic energy as it flows toward the dam and builds a reservoir 420 as it achieves different depths of water during rainy and drought seasons. A reservoir 420 may create practically constant potential energy by releasing extra water over spillways (not shown). A penstock 430 of a dam provides a narrow channel for increasing the river's variable kinetic energy from its slow river flow 410 to more constant kinetic energy at higher flow speed. A turbine 440 turned by the high-speed water flow turns a generator 450. Generator 450 of the dam (there may be several generators across the width of the dam) receives constant speed and generates constant frequency for the generated electricity which leaves the generator by long distance power lines. River flow 410 (variable speed) continues at the output of the dam.

An expensive hydroelectric dam 400 of prior art FIG. 4 may have a plurality of penstocks 430 and generators 450 outputting power to long distance power lines from river flow 410 across the width of the dam 400. In short, a dam 400 blocks normal river flow 410 and builds a reservoir 420. The river flow 410 water is fed through penstocks 430 to turbines 440 which turns generators 450. The river flow 410 flows continuously from the dam 400 except in extreme drought conditions. A hydroelectric dam 400 is an example of a variable river speed "motor equivalent" generator set (ME-G Set).

The Grand Coulee dam, Hoover dam and the Tennessee Valley Authority are exemplary of projects started in the early $20^{th}$ century in the United States for generating hydroelectric power, but these require large dams to build potential energy for turning electric turbine generators. Large hydroelectric generators in such dams on rivers in the United States are now being replaced with more efficient and larger capacity turbines and generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like.

Prior art FIGS. 5A, 5B and 5C show three embodiments of "motor equivalent" generator sets (ME-G sets) 500: a coal turbine 510, a natural gas turbine 520 and a nuclear reactor 530. Coal turbine 510 of FIG. 5A operates by burning coal to produce steam for operating a turbine which turns a generator to generate electricity. The natural gas turbine 520 of FIG. 5B operates similarly except that coal is replaced with natural gas. The nuclear reactor 530 of FIG. 5C operates similarly in that nuclear energy is used to convert water into steam for running a turbine. A large cooling tower receives hot water and cools it for being fed again through a turbine and condenser.

Referring again to prior art FIGS. 5A, 5B and 5C, besides being expensive to build and expensive to operate with high fuel cost, each of the coal and natural gas turbines 510, 520 convert variable energy to constant energy but at the cost of our environment. There may come a time when we will not be able to enjoy the sun because carbon-based fuels may eventually destroy the earth's ozone layer of sun protection.

FIG. 5C shows a nuclear reactor 530 which uses a nuclear power plant to generate steam. Control rods are regulated to produce constant frequency and voltage power in view of a grid load and regulate the temperature of water used by the nuclear power plant's turbine and generator. Nuclear power can be dangerous if not handled and managed properly as exemplified by nuclear accidents in Pennsylvania, Russia and recently in Japan.

Known marine hydrokinetic (MHK) turbines such as run-of-the-river, tidal, ocean and hydrokinetic river turbines and wind turbines have some problems. There is the problem of having to convert a harnessed variable speed (water or wind) to a constant frequency and dependable power output. On the other hand, there are many advantages for harnessing marine hydrokinetic (MHK) over wind energy: for example, the density (mass or inertia) of water is much greater than that of wind. Water flow speed is not as variable as wind speed especially when a river constantly flows in the same flow direction (such as the Mississippi River of the United States). Tides are reversible (high tide to low tide flowing toward the ocean and low tide to high tide flowing in from the ocean). Associated known tidal turbines may be limited to generating power in one direction of water flow (during changing high to low tide or low to high tide) and generate maximum power at only two high and low tide changes during a day and so resultant output power is sinusoidal in nature (water flowing in until a maximum speed is reached and then reversing and flowing out until a maximum speed is reached).

A speed converter to convert variable speed to constant speed is disclosed in U.S. Pat. No. 8,388,481 of Kyung Soo Han, incorporated by reference as to its entire contents. The speed converter is entirely mechanical and so scalable and improves upon the high failure rate, reliability and efficiency of known electrical/mechanical systems. Speed converters under development are also frequency converters and are shown in this and other patent applications and patents of Kyung Soo Han and are referred to as infinitely variable speed converters or simply speed converters.

New Energy Corp, Inc. of Calgary, AB, Canada in collaboration with the present inventor and Differential Dynamics Corporation of Timonium, Md. announced a hydrokinetic turbine that may operate at five kilowatts. These river turbines may be turbines on floating platforms that may come in sizes from five kilowatts to one hundred kilowatts, preferably fifty kilowatts. An installation of a five-kilowatt EnviroGen plant is planned for use by the First Nation communities on the Winnipeg River, requires no dams and may comprise a floating platform anchored in the river. The plant is expected to require no fuel, run twenty-four hours a day from river currents, and there may be no need for a large battery bank. The energy harnessing module may comprise propellers or waterwheels that appear to be vertical or horizontal to face the river water flow of approximately two meters per second at some locations or over three meters per second at other locations on the river. A harnessing module may be located below the water and the floating platform and is susceptible to freeze in Canada's cold winters. The connection between the harnessing module (for example, a waterwheel) to the equipment on the floating platform is mechanical.

Referring briefly to FIG. 6 (prior art), in the Canadian experiment, all components of a renewable energy harnessing module 610 were located below a floating platform and the rest of the components including generator 675 were located on a floating platform on a river. The vertical line connecting vertical axis waterwheel 610 and input shaft 620 was mechanically connected and may be a chain or set of bevel gears that may be added between the waterwheel 610 and input shaft 620. When dipping into the water, these types of components could also freeze.

Most of today's water/electric conversion is directed to hydroelectric dams, tidal influences and small rivers or canals. According to www.mecometer.com, the potential for development of electricity for large rivers is on the order of over one million megawatts in the USA. Also, the capacity for generating electricity using rivers in China is 1.1 million megawatts and that of the entire world over five million megawatts. So, river, ocean and tidal water turbines are not only economically viable, they represent viable renewable energy sources for powering the world without hydrocarbons, high cost and with low maintenance.

A harnessing module may comprise concentric wings, waterwheels, paddle wheels, propellers and the like. A concentric wing harnessing module is described in priority U.S. patent application Ser. No. 16/701,741 filed Dec. 3, 2019 which is demonstrative of a concentric wing or helicopter blade or plane wing used for vertical take-off and horizontal flight. This concentric wing harnessing module may have concentric blades which rotate in tandem in line with the flow of water from a centrally geared shaft at equal rotational speed and create greater torque than other forms of harnessing modules such as waterwheels.

Prior art FIG. 6 shows a known conceptual overview of a Hummingbird mechanical speed converter 600 comprising an ME-G set (motor equivalent generator set). A harnessing module comprising a waterwheel 610 (which may be of many known varieties including a propeller shown) is one form of harnessing module which outputs a harnessed river or tidal or wind flow speed and direction that is variable. The harnessing module such as a propeller shown may be attached to a vane so that it may face any direction of water/wind flow, even vertical (horizontal shown with water/wind flow from the left). A "motor equivalent" 210 as introduced in prior art FIG. 2 may be the harnessing module plus a speed converter (for example, a Goldfinch or a Hummingbird [first and second spur/helical gear assemblies of a known Hummingbird speed converter shown in prior art FIG. 6] described in priority patent applications) to output relatively constant rotational speed from a variable speed and direction of input water/wind flow. The mechanical Hummingbird speed converter 600 has three variables: a variable input rotational speed is provided at input shaft 620 having first and second sun gears 622-1 and 622-2 received via a mechanical gear assembly or a chain shown as a vertical line from a shaft of waterwheel 610, a control output of control motor 630 outputting constant rotational speed via control motor shaft 625 and shaft gear 627 meshed to sun disc/sleeve/sun gear 635 and a constant rotational speed output variable of a generator shaft 670 received via shaft gear 665 to electricity generator 675. Mechanical speed converter Hummingbird (ME-G set) converts a variable input river or tidal/wind speed and direction to a relatively constant rotational speed output to generator 675. The constant rotational speed and direction are used to turn the electricity generator 675 where the constant speed and direction generate electricity (voltage and current) at constant frequency. The ME-G set comprises the Hummingbird speed converter 600 which receives variable speed (power) from the harnessing module (waterwheel 610) (exemplified by a propeller 610 with a horizontal shaft (unnumbered) for receiving water/wind flow from the left), the control motor 630 and generator 675. Generator 675 has shaft 670 and shaft gear 665 which may mesh with a sun disc of sun gear/sleeve/sun disc 660 at any point around the sun disc. For example, generator 675 may be located at the top right of FIG. 6. Intermediate components of the Hummingbird speed converter 600 include carrier gear assemblies (including carrier gears 650-1, 650-2, planetary gears 640-1, 640-2, 645-1, 645-2 and unnumbered pins) and output sun gear/sleeve/sun disc 660 meshed with shaft gear 665 of generator shaft 670.

Prior art FIGS. 7A, 7B and 7C show tables demonstrating a rotational speed conversion at no load, varying load and a solution to a problem of varying control motor rotational speed and generator rotational speed and electrical frequency caused by varying input rotational speed and varying load. FIG. 7A uses an input motor 710 running within a range of eight hundred to sixteen hundred rpm to simulate a harnessing module for operating a control motor 720 (which may be AC or DC powered) and generator 730 at a constant frequency of 60 Hz when the input motor rotational speed is set at 1200 rpm. With no load, a constant control motor and generator speed of twelve hundred rpm will generate a constant electric generator output at 60 Hz. However, varying the input motor 710 rotational speed causes the control motor 720 rotational speed to vary from 1191 rpm to 1208 rpm, the generator 730 rotational speed to do the same and the frequency of generator 730 output electricity to vary from 59.4 Hz to 60.6 Hz at load 750 being no load in Watts. The control motor speed 720 dictates the output speed which is the generator speed 730. Frequency 740 of 60 Hertz is produced at the control motor speed 720 of 1,200 rpm.

Prior art FIGS. 7B and 7C show how the speed converter of FIG. 6 operates where, as in FIG. 7A, the "input motor" 710 simulates the variable rotational speed of a harnessing module such as waterwheel 610. Referring to FIG. 7B, the input motor 710 provides a variable rotational speed range between 800 and 1600 rpm. By varying load 750 on the generator 730, the output frequency 740 does not remain a constant 60 Hz (except at no load and a 1200 rpm control motor 720 and input motor 710 rotational speed). The varying load 750 causes (Cause 765) Effect 1 770 and the output frequency 740 decreases below 60 Hz as the load 750 increases. When there is no load 750, the output electricity frequency of generator 730 is the desired 60 Hz per the horizontal box 760. However, the generator 730 output frequency 740 drops to 59.7 and then to 59.3 Hz with increasing load (Effect 1 770). The increasing load 750 also causes Effect 2 775 which is that the control motor 720 and generator 730 rotational speed drops from, for example, 1200 rpm to 1196 to 1191 rpm.

Prior art FIG. 7C shows how this increasing load 750 may be adjusted without changing the constant generator output frequency 740 from 60 Hz. The solution is to adjust the control motor rotational speed back to 1200 rpm at adjustment 780 by increasing the power (AC or DC) feeding the control motor 720 so that it rotates at 1200 rpm regardless of load value. Effect 1 785 is that all generator rotational speeds equal 1200 rpm and Effect 2 790 is that all generator 730 output AC electrical frequencies with varying load are restored to 60 Hz with varying load 750.

Prior art FIGS. 8A and 8B show a perspective view and a cut view of a known exemplary Superior Electric POWERSTAT® variable voltage transformer (VVT) 800 for controlling variable voltage, current and power which, in particular, may provide continuously adjustable output voltage with varying load (at the output) and varying voltage when detected at the input and fed forward to the VVT by a voltage regulator (see, for example, VVT 940 and voltage regulator 935 of FIG. 9A). The unnumbered knob at the top of FIG. 8A turns the Shaft shown in FIG. 8B and increases or decreases the voltage, for example, via a servo motor (not shown) (see control motor 930, FIG. 9A) as a sensor may notice a varying rotational speed of control generator 950. Cut view FIG. 8B shows the various components of a POWERSTAT variable voltage transformer (VVT) comprising a shaft for varying the voltage, a carbon brush, a Powerkote coil and core and terminals as seen in FIG. 8A including a terminal for a servo (control motor) control (there being no need for a manual knob seen in FIG. 8A).

Consequently, there remains a need in the art to provide applications of a harnessing module, at least one speed control module and a power generating module for a hydrokinetic or wind turbine to provide a constant value of power at a constant frequency.

SUMMARY OF THE PREFERRED EMBODIMENTS

Embodiments of control systems for renewable energy electric power generation at constant frequency may involve the combination of first and second spur/helical gear assemblies called Transgear gear assemblies as a Hummingbird control module, the Hummingbird control having a constant speed control motor, the Hummingbird control for converting variable rotational speed input to constant electrical frequency. A water flow power harnessing module may be a waterwheel, paddle wheel, concentric rotating wing harnessing module or other module designed to harness energy and in particular, balancing torque or $\tau$, at an approximately constant rotational speed or $\omega$ to generate at of renewable energy or power. It is a principle of the present invention that $\tau$ (Harnessing Module)=>$\tau$ (Controlling Module)+$\tau$ (Generating Module) since some $\Delta\tau$ (Harnessing Module torque) or $\Delta\omega$ (Harnessing Module speed) shall be released or eliminated if the water speed and generated torque for driving the controlling and generating modules may be released to achieve a constant, for example, fifty kilowatt output to an electric power grid or distributed locally.

A further principle of the present invention is that of achieving constant torque in a balanced three variable system (input, output and control) such that $\tau$=Energy/$\omega$ where $\omega$ is rotational speed of output. Energy may be generated electrical power at a baseline level at a constant frequency. By balancing torque $\tau$ and speed $\omega$ in a closed or three variable Hummingbird control system, one may be able to use a constant rotational speed control motor utilizing only about a tenth of the harnessed water flow energy (a relatively small control energy input compared with the energy that is harnessed or generated) to generate a constant, for example, fifty kilowatts of renewable energy. That is, depending on the water flow input and the torque it exerts on a harnessing module, a base-line value of electrical energy may be achieved that is available as electric power output so long as output power exceeds control power.

In one embodiment, to reduce a requirement for generating power to run a constant speed generator at, at least, a constant base-line power, a conventional direct current generator or an AC generator (turned by the harnessing module) or an existing power grid may be used for power to run a constant speed control motor. An embodiment of a power collection module on land may be powered by storage batteries storing excess generated DC power. Priority U.S. patent application Ser. No. 15/707,138 filed Sep. 18, 2017, now U.S. Pat. No. 10,378,506 issued Aug. 13, 2019, suggests a commutator-less and brush-less direct current generator that is more efficient than known DC generators and may be used to generate direct current power for a control motor or a control motor may operate with alternating current.

Conventional or recent designs of a direct or alternating current motor for providing a constant rotational velocity and frequency may have an output to regulate a Transgear spur/helical gear assembly or assemblies referred to herein as a Hummingbird variable to constant speed converter control apparatus driven by a specially designed renewable energy harnessing module for a particular river or tidal estuary application so as to not require much power to be drained from an electric grid or from the generated power to operate the constant frequency alternating or direct current generator at constant rotational speed $\omega$ and a baseload level of power. A variable voltage transformer may be used to regulate the voltage received via flexible electrical cables from different wind and hydrokinetic renewable energy sources to deliver and regulate variable frequency voltage and current at the power collection module.

A principle discovered during development of a Hummingbird control comprising first and second spur/helical gear assemblies is an analogy between Pascal's Principle applicable to a closed hydraulic system having force=pressure×area where the control force is exceeded by the useable force to what may be referred to as Kyung Soo Han's principle of rotary motion control (analogous to Pascal's principle of hydraulics, also in a closed electro/mechanical system or three variable control system), where mechanical power in or electric power out yields the same equation: power=torque×speed where a control motor power is exceeded by the output power as applied to a harnessing module to achieve an electrical advantage at the output.

The controlling module comprising a controlled or constant speed motor useful, for example, in wind and river/tidal/ocean wave/ocean current (MHK) turbines along with the use of spur/helical gear assemblies of sun gears, sets of planetary gears and carrier gears and brackets referred to herein as Transgear gear assemblies or simply Transgear, Hummingbird and Kingfisher control modules may have a known direct current or alternating current constant speed motor or alternating current constant speed control motor or both. Hatch control of a waterwheel, a paddle wheel, a concentric oppositely rotating propeller module (harnessing module) or other known renewable energy harnessing module (water) (or pitch (wind) control for wind turbines) may be needed in tidal estuaries for two directions of water flow.

A river turbine (river flow being relatively constant in one direction) or a tidal turbine (river flow direction changing with the tides) may comprise a harnessing module, a controlling module and a generating module. It is suggested herein to measure waterwheel rotational speeds and developed torque over a period of a month or more at a specific river location (for example, where the current is swift and the depth of the river is greater than, for example, four feet,) with a generator load (for example, fifty kilowatts baseline power output) in order to design a harnessing module, control module, generating module closed system that may balance torque and variable speed sufficient to turn a generator so as to produce a constant value of power at an electrical advantage, for example, fifty kilowatts. As will be described herein, location on a given river having a narrow or wide width or greater depth than a rocky stream may impede the power output and so the system including the harnessing module must be carefully designed. Designs of a waterwheel or propeller or other harnessing modules may be used if designed properly following the principles of the present invention and may include propeller, a concentric wing assembly, a pitched blade waterwheel and the like. Such a value of power from a harnessing module at constant frequency may power an entire village proximate to a river or tidal estuary. As introduced above, a harnessing module may be rotated 180 degrees for converting wind or tidal flow in two or multiple directions. The wind or water harnessing module itself may turn in one rotational direction but may be equipped with a vane to turn the wind or water harnessing module to face the direction of wind or water flow. An input shaft from a gear box via a harnessing module may turn a Hummingbird speed control system or a Hummingbird/Kingfisher combined system introduced herein having a constant speed control motor system and a generating module for delivering renewable energy captured by the harnessing module to a generator to a variable load of an electric power grid.

The gears of a so-called Hummingbird speed control system may be buffered to a harnessing module by a known magnetic gearbox assembly available from Magnomatics Limited of Sheffield, UK. The magnetic gear assembly permits slippage between gears of a magnetic gearbox so that a gust of wind or sudden increase in water flow velocity will not damage gears of a gearbox or require the use of a clutch. Magnetic gear assemblies (not shown) may be used in FIGS. 9A and 9B as part of mechanical inputs 910. A gear box or a magnetic gear assembly may be replaced by direct connection to the Hummingbird via a torque meter and a tachometer (rotational speed meter) which, in turn may be used to assure a constant output power at the river turbine output. Preferably, a flexible electricity cable may be used to connect a harnessing module/generator combination to a land-based module or a plurality of land-based modules for connecting combined electric power to an electricity grid.

In wind, river, ocean and tidal MHK turbines, a mechanical speed or frequency converter (the Hummingbird or Hummingbird/Kingfisher) may be used for the purposes of adjusting the harnessed rotational speed of the input which may be slow or fast depending on the rate of river flow or bi-directional tidal flow velocity and desired load value in kilowatts (or larger) with respect to a desired constant output speed (rotational velocity or electric power frequency) for generating renewable electric power to be fed to an electric power grid. A harnessing module may be designed to operate in both directions of tidal current flow for, for example, sixteen hours of a day at 25 kilowatts, four hours a day at 10 kilowatts and store excess generated power in a battery power system for use to provide 25 kilowatts during the eight hours of insufficient delivered power.

An embodiment of a variable speed converter has been constructed with a variable voltage transformer of a land module, and a floating platform for such equipment has been eliminated. FIGS. 9A and 9B show mechanical input to a land module from an underwater harnessing module (horizontal propeller shown). FIG. 9A shows an embodiment of a control and generating module comprising a Hummingbird gear assembly of first and second ring gears and a spur/helical gear assembly referred to herein as a Transgear gear assembly. The Hummingbird ring gear assembly may have a mechanical input connection from a harnessing module via a vertical line (which may comprise a chain or a set of bevel gears). The mechanical input 910 may be electrical if a generator (not shown in FIG. 9A) receives a variable rotational speed from harnessing module 905 and delivers a variable electrical voltage or power input by a flexible cable to an input motor (not shown in FIG. 9A) for driving input shaft 920. FIG. 9A shows a feedback path from a variable load via a gear of the generator shaft to a shaft gear of a shaft of a variable voltage transformer connected to a voltage regulator and control motor where the voltage regulator is also connected to a control generator. FIG. 9B shows a similar mechanical input 910 from a harnessing module (horizontal propeller shown) to a land module input generator for providing electrical power to an input motor and to a control motor via a voltage regulator and a variable voltage transformer. As with FIG. 9A, the mechanical input 910 may be electrical if a generator 912 (shown as receiving the mechanical input) located proximate to harnessing module 905 receives the variable mechanical power directly from harnessing module 905. An input motor 914 receives electrical power from generator 912 for driving generator 975. FIG. 9C shows an electrical cable input from a harnessing module/generator combination having a flexible electrical cable connection to an input motor and via a voltage regulator and a variable voltage transformer to a control motor (servo motor). FIG. 10A shows a harnessing module receiving variable water flow from the left comprising a variable speed concentric wing assembly combined with an electricity generator providing variable electrical input power ((1) Input: Power) to a three variable control box. A second variable is constant output power ((2) Output: Power) provided to a motor generator set and a third variable is variable voltage feedback ((3) Feedback: Power) to the three variable voltage control box for sensing a variable load of an electricity micro-grid and a variable input power due to variable water flow for assuring a constant voltage output variable. FIG. 10B shows a harnessing module comprising a concentric wing assembly/generator receiving variable water flow from the left for providing a variable voltage input by a flexible electric cable to a variable voltage transformer and to a control motor/voltage regulator (VR) and central processing unit (CPU) referred to herein as a motor-controlled Kingfisher-M three variable control with feedforward input electric power, output power from a motor/generator set and feedback voltage of a variable load condition to the voltage regulator and central processing unit. The Kingfisher-M receives the feedback voltage sensed at the voltage regulator which also receives a feed-forward variable voltage from the harnessing module/generator combination. The voltage regulator inputs the feed-forward and feed-back voltages processed by the CPU as a comparator to the control motor (for example, a servo motor) as an input via a shaft of the variable voltage transformer. FIG. 10C introduces an embodiment which receives a variable voltage input from a harnessing module/generator combination receiving variable water flow from the left, the variable voltage transmitted by a flexible electrical cable input to a control and generating module which receives a feed-forward and a feedback signal to Kingfisher-T or Transgear (spur/helical gear) assembly module. The Transgear gear assembly receives variable input voltage from an input motor. A control motor is regulated by a variable voltage transformer having a control shaft connected to the Transgear gear assembly and a feedback of rotational speed of an electricity generator as well as a feedforward variable harnessed input power provided via the variable voltage transformer to the Transgear gear assembly of the Kingfisher-T embodiment. FIG. 10D shows a two speed converter control and generating module embodiment comprising Hummingbird and Kingfisher control. Variable electric input voltage from a harnessing module/generator combination (not shown) is input by a flexible electric cable, for example, to a control and generator module comprising an input motor having a motor shaft that is connected to a dual ring gear assembly Hummingbird which drives an output generator at constant frequency and to a Kingfisher. The Kingfisher receives generator rotational speed input as a feedback signal. A voltage regulator and a variable voltage transformer receive a feedforward signal from the electrical input from the harnessing module/generator combination. A control motor provides a control motor rotational speed input via a control motor shaft having sun gears connecting to the first ring gear of the Hummingbird and connecting to the input sun disc/sleeve/sun gear of the Kingfisher. FIG. 11 shows the concept of a "generator equivalent" which may be combined with a "motor equivalent." A variable load condition causing variable electrical frequency may be sensed at the "generator equivalent" to assure constant electrical frequency at a "motor equivalent"/"generator equivalent" combination. Also, a variable input power may be provided to the "motor equivalent" to convert the variable power to constant speed for driving the "generator equivalent." FIG. 12 shows harnessing more than rated power of a control motor at a minimum rotational speed with feedforward from the harnessing module/generator combination and feedback from the variable load compared at a power comparator. Further embodiments are shown in FIGS. 13A, 13B and 13C, of an application of providing multiple sets of poles axially by, for example, four generators, each having multiple sets of poles, for example, six poles for each generator versus, per FIG. 13B having a single large circumference generator having twenty-four poles. In an exaggerated case (not shown) FIGS. 13B and 13C may show how a known generator having three poles times twenty or sixty poles having an increased diameter (similar to prior art FIG. 13B) may be replaced by a small diameter set of, for example, four generators in line (FIG. 13C), each having fifteen poles or sixty poles equivalent to the large diameter sixty pole generator (FIG. 13B). FIG. 14 shows six different embodiments of harnessing modules in combinations or for various uses. Where the first of six concepts ((1) Non-renewable applications) is a usage of a speed/voltage converter for automotive (infinitely variable transmissions), HVAC (compressors) and power-take-off/control applications. The second of six concepts ((2) Wind Turbines (HAWTS)) is use in HAWT (horizontal wind turbines) with multiple generators such as three generators in series driven by a horizontal wind flow. The third concept ((3) Wind Turbines (In-line) is use in VAWT (vertical wind turbines) where three generators are shown vertically arranged to receive wind from a fixed hatch and variable electricity delivery to a control and generating module. The fourth concept ((4) Tidal Turbines) is use in tidal turbines where the harnessing modules may be in parallel. These turbines in a top view are shown for use in a developed water inlet and receive water in two directions per day, during low to high tide and high to low tide transitions. In an ocean wave turbine fifth concept (5), a honeycomb of wave turbines seen in top view may harness energy from waves in multiple directions. A sixth concept ((6) ocean current turbines) is for use in ocean current turbines where ocean current flow is shown in one direction to three harnessing modules in parallel crossing the ocean current. Finally, FIG. 15 shows the concept of providing various electrical inputs from, for example, renewable energy sources to a power collection (and switching station) where the combined or selected electrical inputs fed by electrical cable from different renewable energy sources as well as other sources (not shown) may be collected (and switched) to one or more control and generating modules to an electric grid having varying load. Samples are considered having three variables and different "Hummingbird" and "Kingfisher" varieties of simpler and more complex forms may be constructed and tested. These Hummingbird/Kingfisher control varieties of variable to constant frequency and voltage control all provide mechanical synchronization of variable input to constant output and efficient mechanical control of speed, for example, operating at a multiple of 50 Hz (European) such as 400 Hz or 60 Hz (US) to generate constant voltage and constant power at constant alternating current frequency and the like.

As the three-variable spur/helical gear assembly called a Transgear gear assembly has developed over time from a Goldfinch control system to a first Hummingbird version described in priority U.S. patent application Ser. No. 15/267,655 filed Sep. 16, 2016, after simplification, may comprise two spur/helical gear assemblies combined and share a common shaft coupled to a renewable energy harnessing module with variable speed rotation. The two Hummingbird Transgear assemblies may be reduced in complexity to a single mechanical assembly with few moving parts as samples have been constructed and simplified. It is important to note that since a speed converter converts variable speed to constant speed and converts constant speed to constant frequency, DDMotion's speed converters may be called a mechanical frequency converter or a "rotary frequency converter" as is called in the industry to differentiate from an electronically controlled variable power converter or variable frequency converter (VFC) or variable frequency drive (VFD) which are less efficient and may break down easily.

There remains a need in the art for a constant voltage and frequency regulator for use in generating electricity via a mechanical connection to a land module per FIG. 9A or 9B or using an electrical connection to a land module per FIGS. 9A, 9B, 9C, or a control and generating module per FIGS. 10A, 10B, 10C, 10D, 11 and 12, for example, using flexible electric cables, the elimination of a floating platform and other embodiments such as generators in line of FIG. 13C, different arrangements of harnessing modules per FIG. 14 and various electrical inputs to a power collection module that may be collected at the power collection module and switched to one or more control and generating modules for distribution to an electricity grid per FIG. 15 as will be further described below. These and other embodiments will be described with respect to the drawings, a brief description of which follows.

BRIEF DESCRIPTION OF THE DRAWINGS

Prior art FIG. 1A through FIG. 1C respectively show a prior art generation of a constant frequency electricity from a constant rotational speed of a motor and the concept of introducing a variable power input, for example, from a harnessing module such that a "motor equivalent" (see FIG. 2) may include a harnessing module of a source of renewable energy such as water energy from a river, an ocean or the reversal of the tides.

Figure 2:
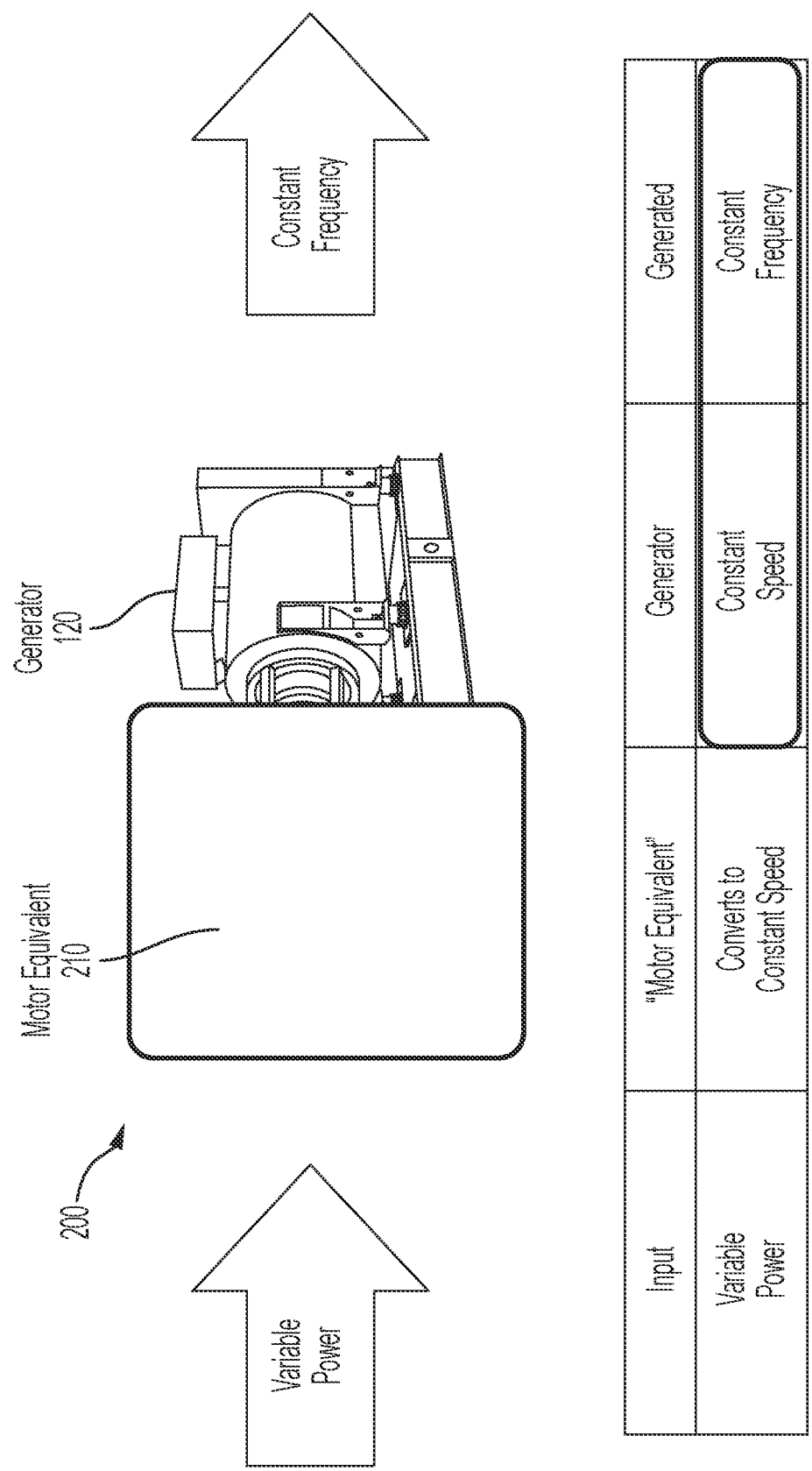

Prior art FIG. 2 comprise a prior art concept of a "motor equivalent" replacing a constant speed motor where the motor equivalent is, for example, a renewable energy harnessing module. Not shown is the concept of a "motor equivalent" which may receive a variable input and produce a constant electricity output regulated, for example, by a feedforward process by sensing the variable input from a harnessing module. This is an example of a "motor equivalent" generator set (ME-G set).

Figure 3:
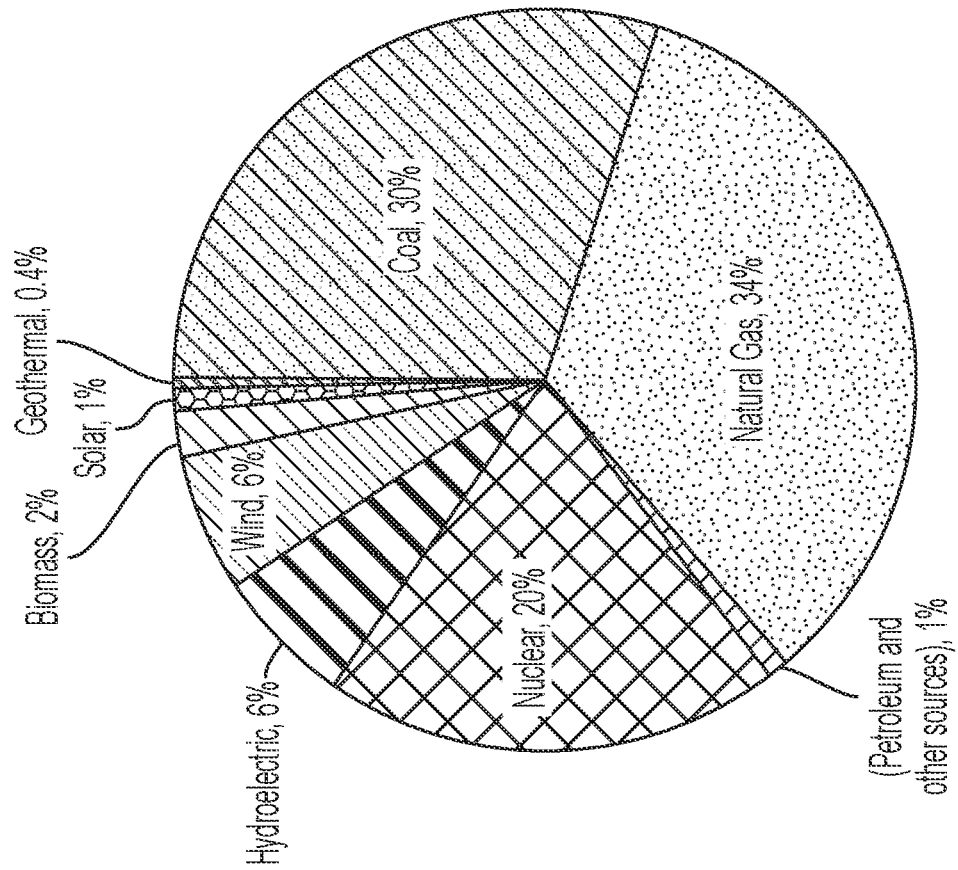

Prior art FIG. 3 comes from a 2016 reference entitled Net Electricity Generation in the USA showing that renewable energy sources only are used to provide 15.4% of the electricity used in the United States and thermal turbines provide 85% of the electricity in the United States.

Figure 4:
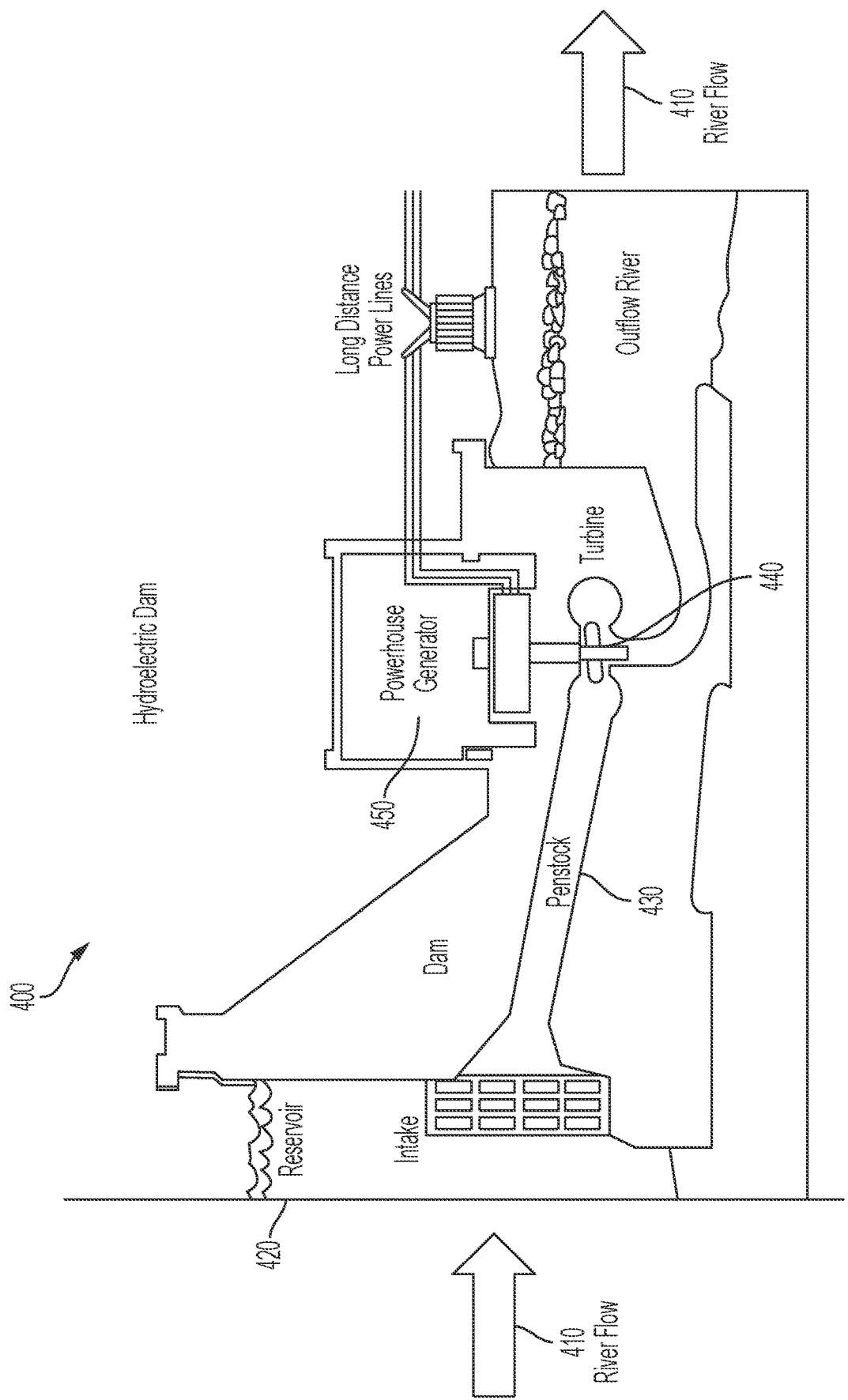

Prior art FIG. 4 shows an example of a hydroelectric power plant (a dam using a reservoir 420) to generate electricity using a penstock 430 below the water level of a reservoir 420 having potential energy that is converted to kinetic energy by the penstock below. The water flow 410 rushing through the penstock 430 delivers practically constant rotational speed for turning a turbine 440 whose shaft turns a generator for generating electric power for delivery by long distance power lines to an electric grid. This is an example of a "motor equivalent" generator set (ME-G set).

Figure 5A:
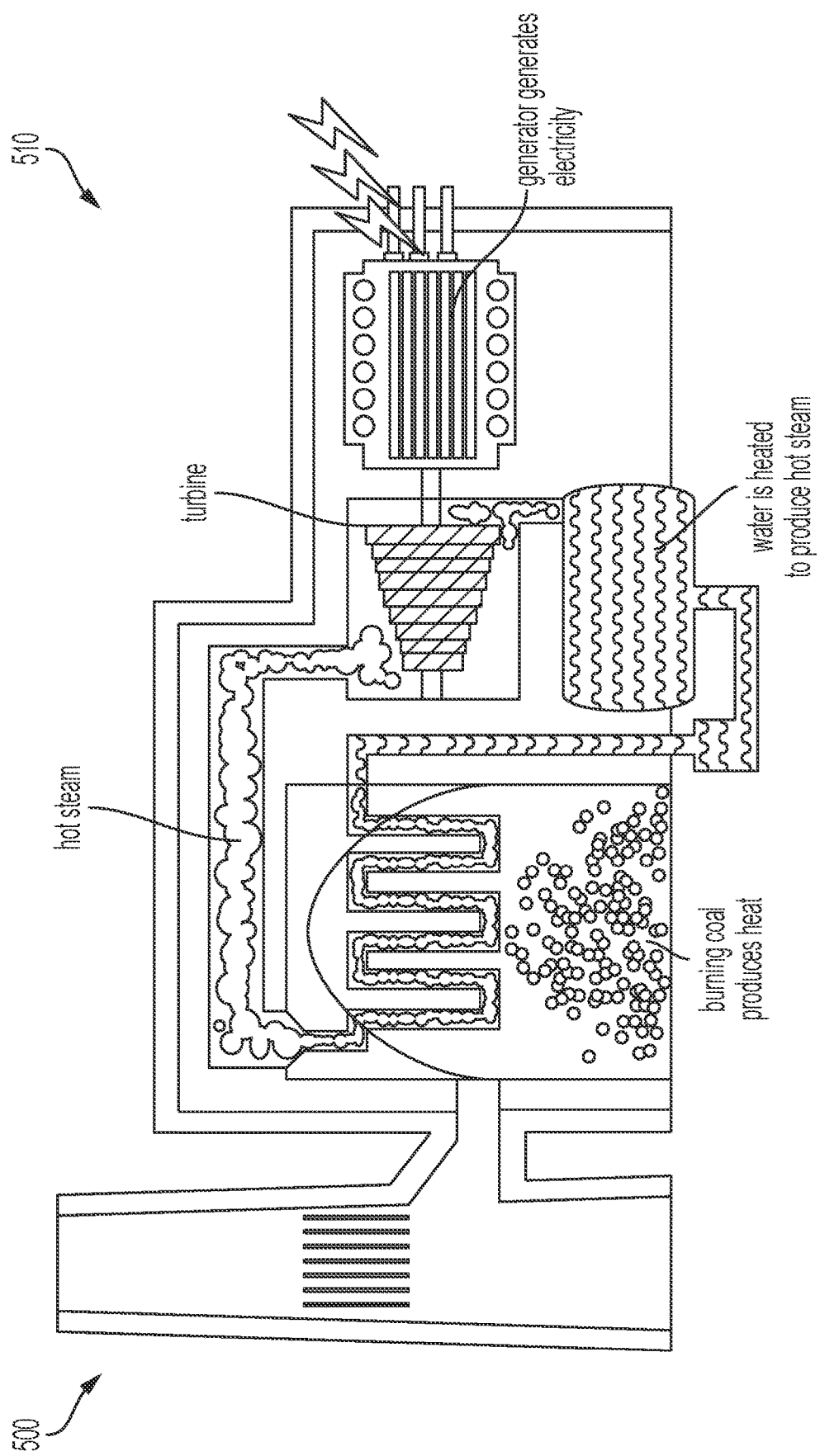
Figure 5B:
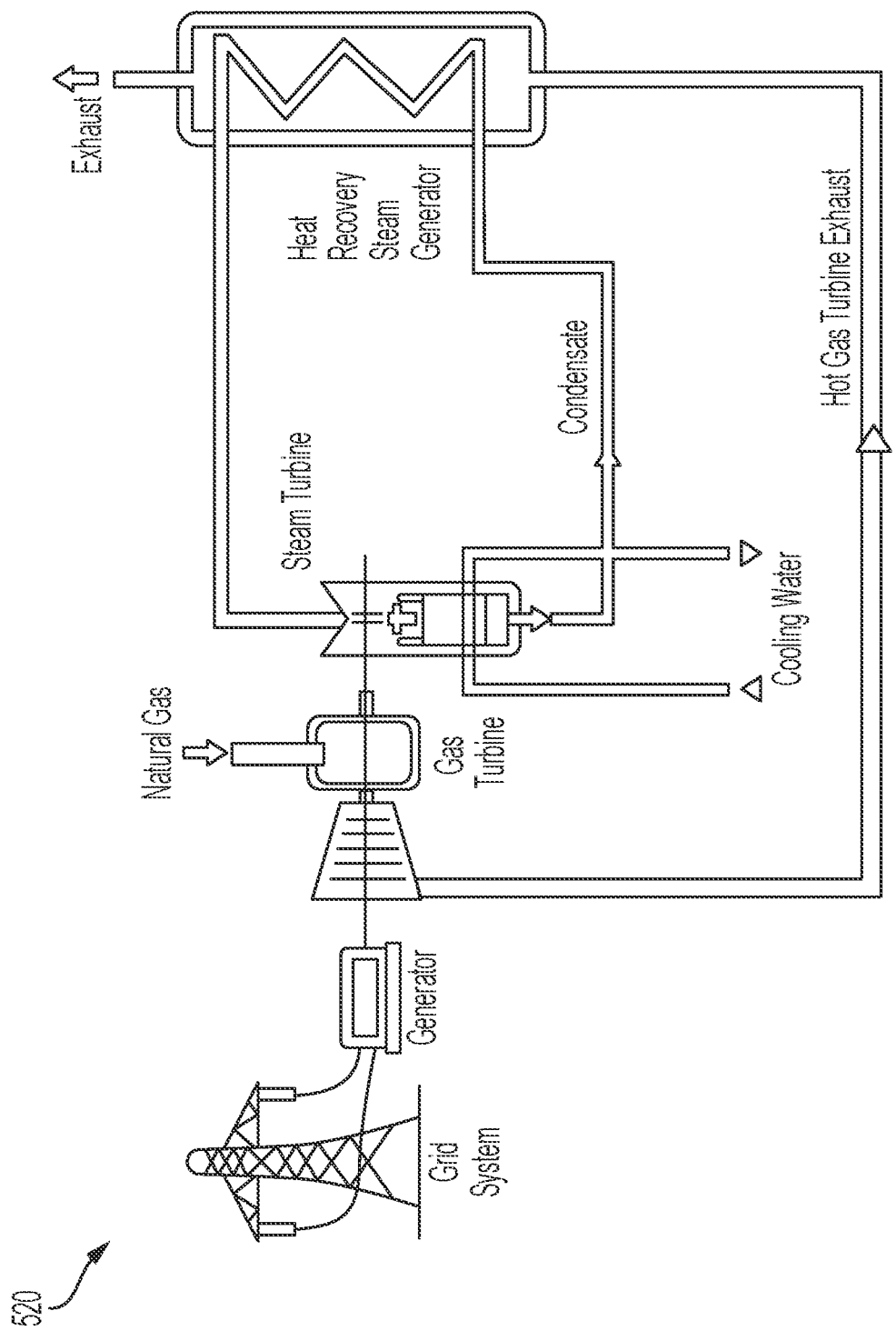
Figure 5C:
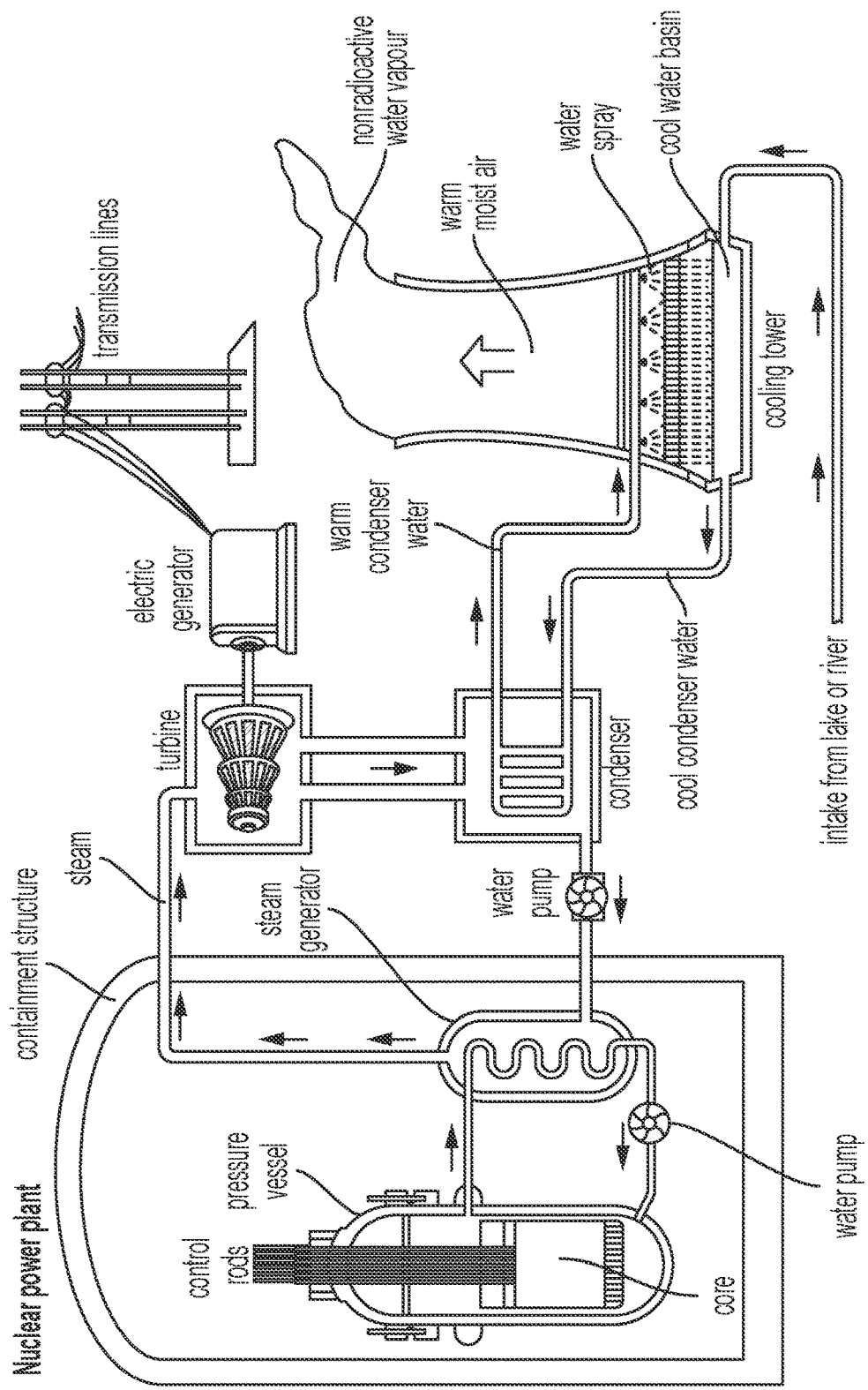

Prior art FIGS. 5A, 5B and 5C respectively provide examples of a coal turbine 510, a natural gas turbine 520 and a nuclear reactor 530 which are examples of motor-equivalent generator sets (ME-G sets).

Figure 6:
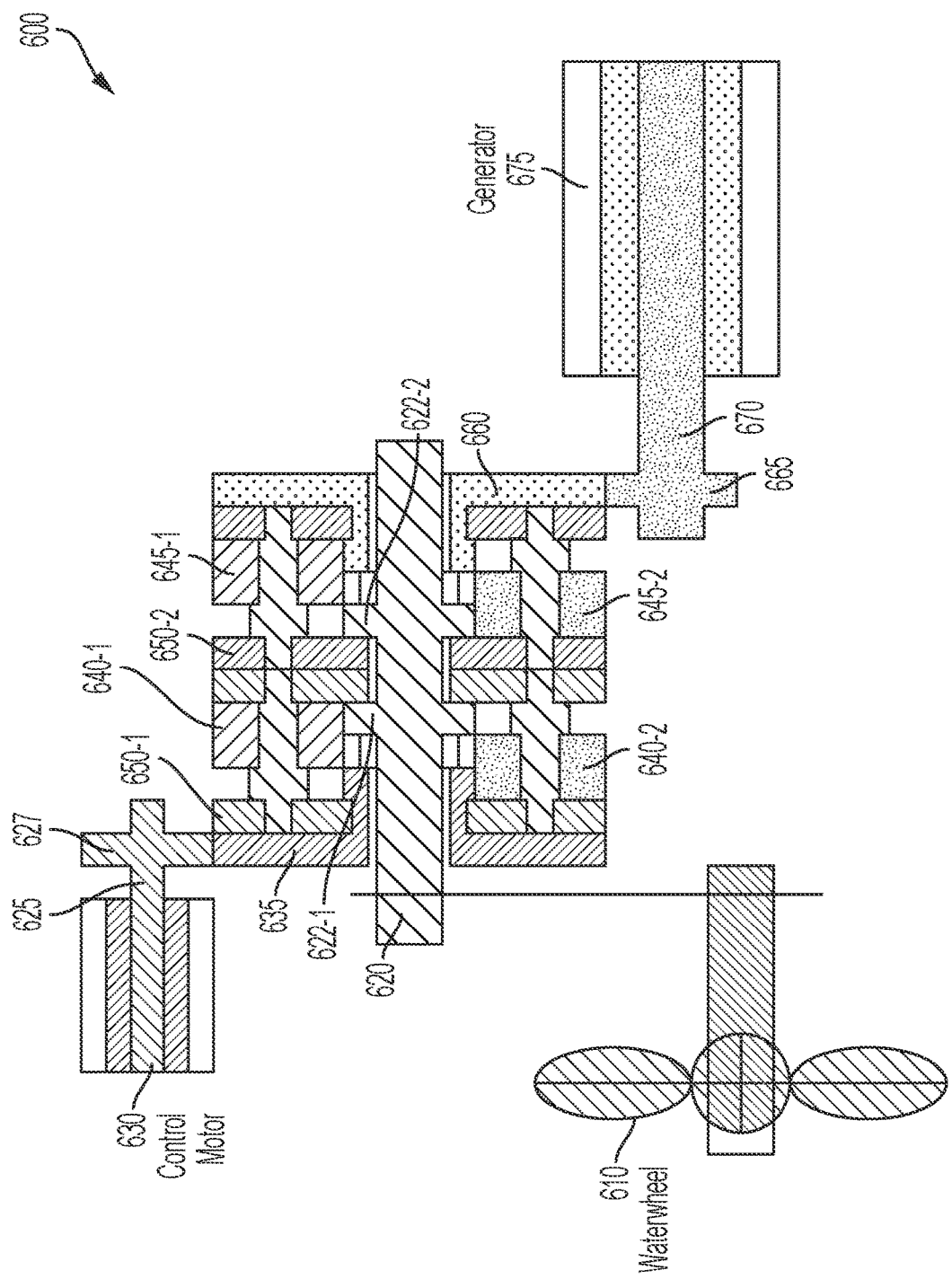

Prior art FIG. 6 shows a known conceptual overview of a mechanical speed converter 600 comprising a motor equivalent generator set (ME-G set). A waterwheel (which may be of many known varieties) is one form of harnessing module which outputs a river or tidal speed and direction that is variable. A "motor equivalent" as introduced in FIG. 2 may be the harnessing module plus a speed converter (for example, a Goldfinch (not shown) or a Hummingbird (shown) described in priority patent applications) to output relatively constant rotational speed form a variable speed and direction input water flow. The mechanical speed converter 600 has three variables: input from waterwheel 610 (harnessing module), control motor 630 outputting rotational speed via control shaft to input sun disc/sleeve/sun gear 635 and rotational speed output of a generator shaft 670 electricity generator 675. Mechanical speed converter Hummingbird converts a variable input river or tidal speed and direction to a relatively constant speed and direction. The constant rotational speed and direction are used to turn the electricity generator where the constant speed and direction generate electricity (voltage and current) at constant frequency.

The ME-G set of FIG. 6 comprises the Hummingbird speed converter 600 which receives variable speed (power) from the harnessing module (exemplified by a propeller) and a generator 675. Generator 675 and generator shaft 665 may mesh with a sun disc of sun gear/sleeve/sun disc 660 anywhere around the sun disc such as at the top of the sun disc rather than the bottom (shown). Intermediate components of the Hummingbird speed converter 600 include carrier assemblies (including carrier gears and pins); first planetary gears; second planetary gears and output sun gear/sleeve/sun disc meshed with a generator shaft sun gear. A Hummingbird speed converter may comprise first and second spur/helical gear assemblies (shown in FIG. 6) or first and second ring gear assemblies; (for example, see FIGS. 9A, 9B, 9C, 10D and 12).

Figure 7A:
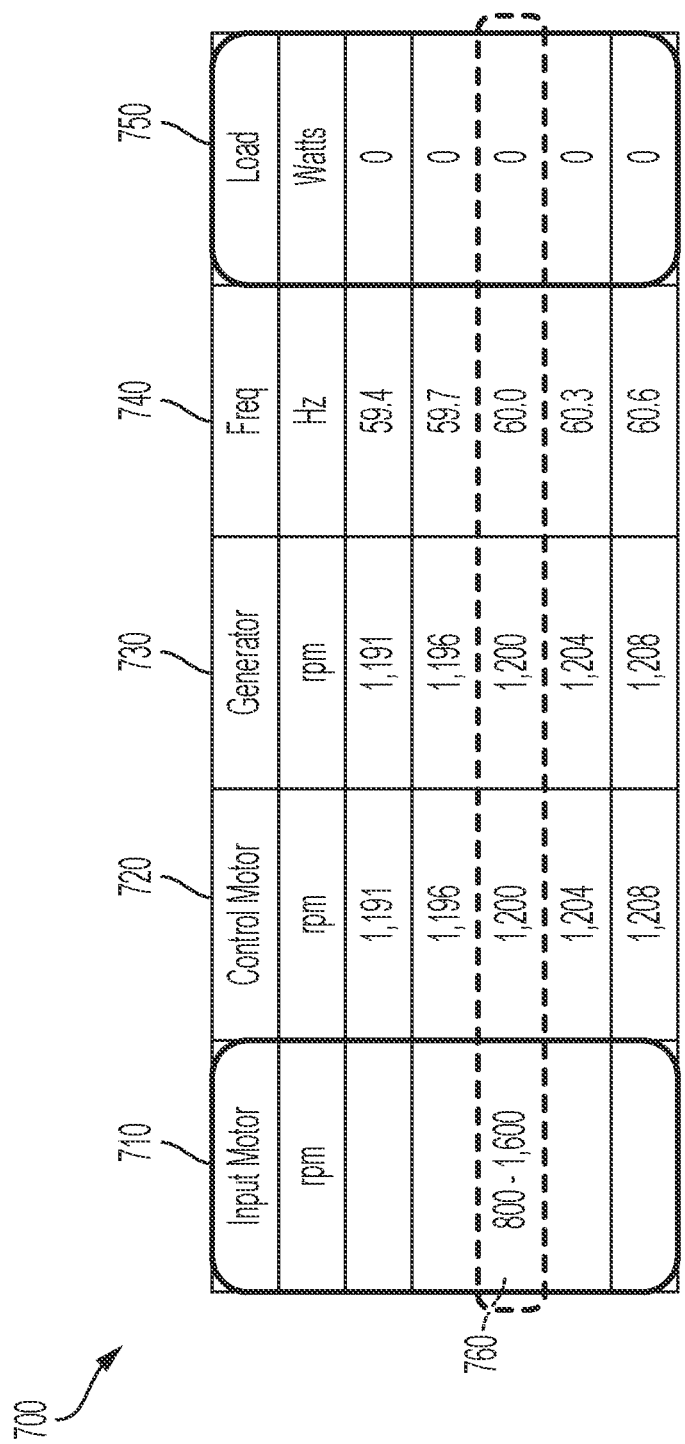
Figure 7B:
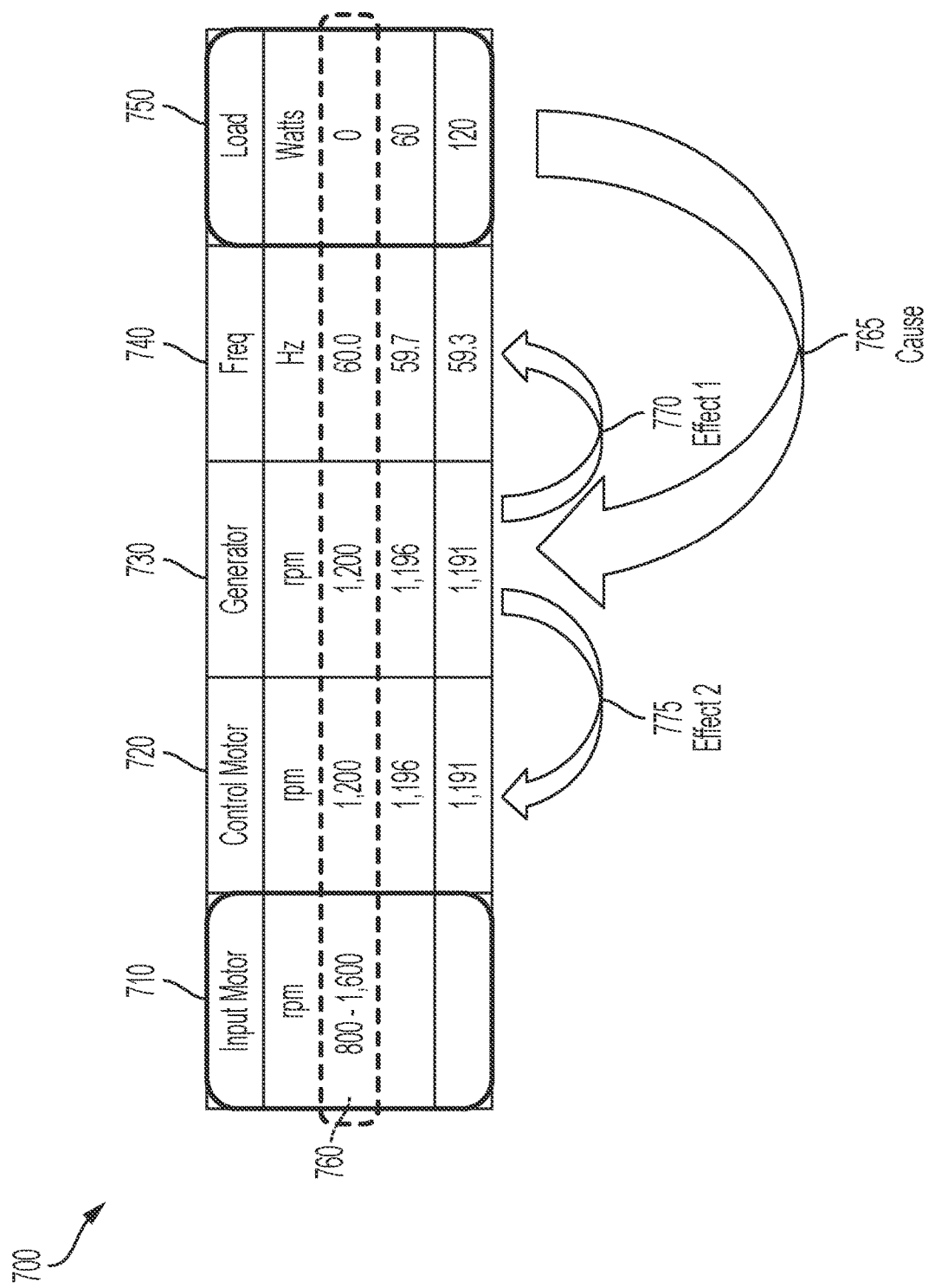
Figure 7C:
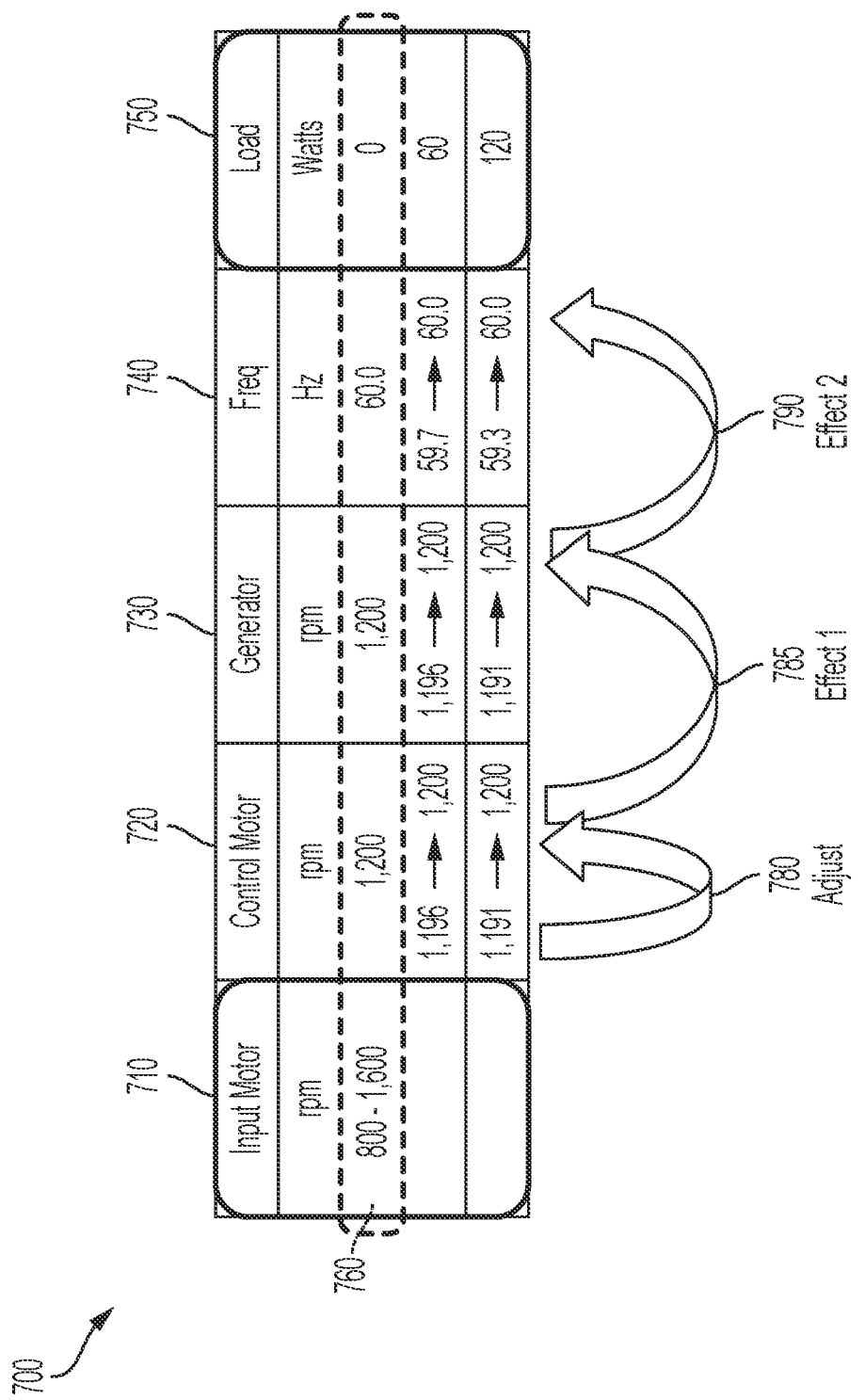

Prior art FIGS. 7A, 7B and 7C show tables 700 demonstrating a rotational speed conversion at no load, varying load and a solution to a problem of varying control motor rotational speed and generator rotational speed and electrical frequency caused by varying input rotational speed and varying load. FIG. 7A uses an input motor running within a range of eight hundred to sixteen hundred rpm to simulate a harnessing module for operating a control motor 720 and generator 730 (and ME-G set) at a constant frequency of 60 Hz when the input motor rotational speed is set at 1200 rpm. With no load, a constant control motor and generator speed of twelve hundred rpm will generate a constant electric generator output at 60 Hz. However, varying the input motor 710 rotational speed causes the control motor 720 rotational speed to vary from 1191 rpm to 1208, the generator 730 rotational speed to do the same and the frequency of generator output electricity to vary from 59.4 Hz to 60.6 Hz at load 750 being no load in Watts.

Prior art FIGS. 7B and 7C show how the speed converter of FIG. 6 operates where the "input motor" 710 simulates the variable rotational speed of a harnessing module. An input motor provides a variable rotational speed range between 800 and 1600 rpm, and it may be seen by varying the load on a generator that the output frequency 740 does not remain a constant 60 Hz (except at no load and a 1200 rpm control motor and input motor rotational speed). The varying load 750 causes (Cause 765) Effect 1 770 and the output frequency 740 decreases below 60 Hz as the load 750 increases. When there is no load 750, the output frequency is the desired 60 Hz per the horizontal box. However, the generator output frequency 740 drops to 59.7 and then to 59.3 Hz with increasing load (Effect 1 770). The increasing load 750 also causes Effect 2 775 which is that the control motor 720 and generator 730 rotational speed drops from, for example, 1200 rpm to 1196 to 1191 rpm.

Figure 8B:
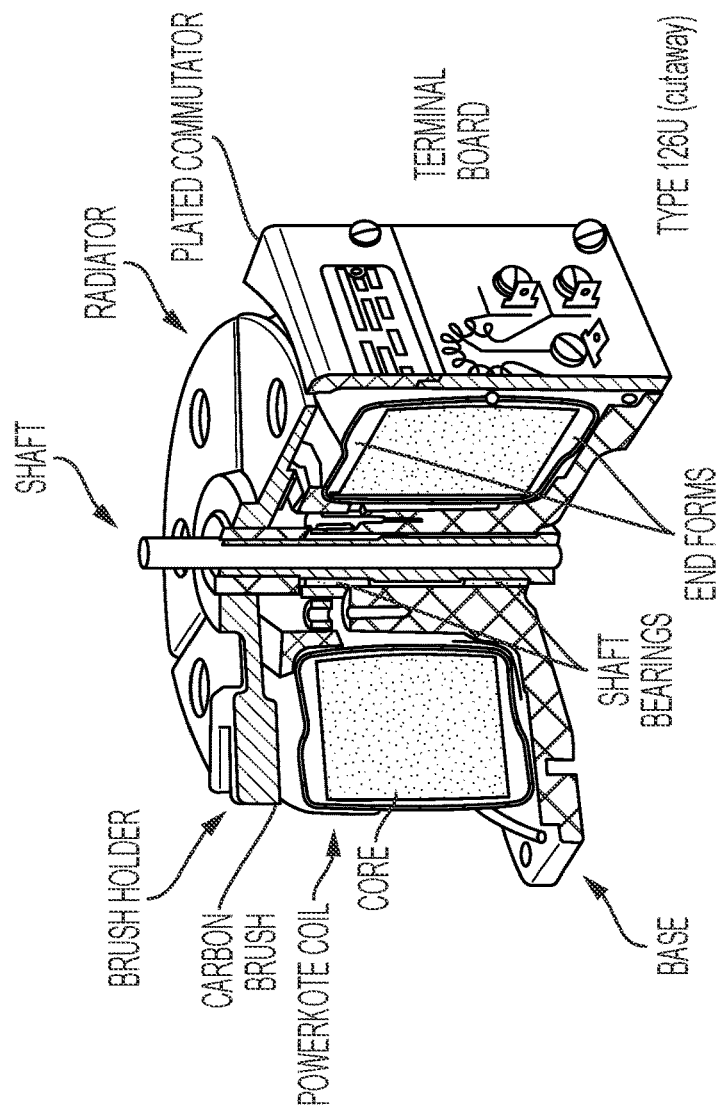
Figure 8A:
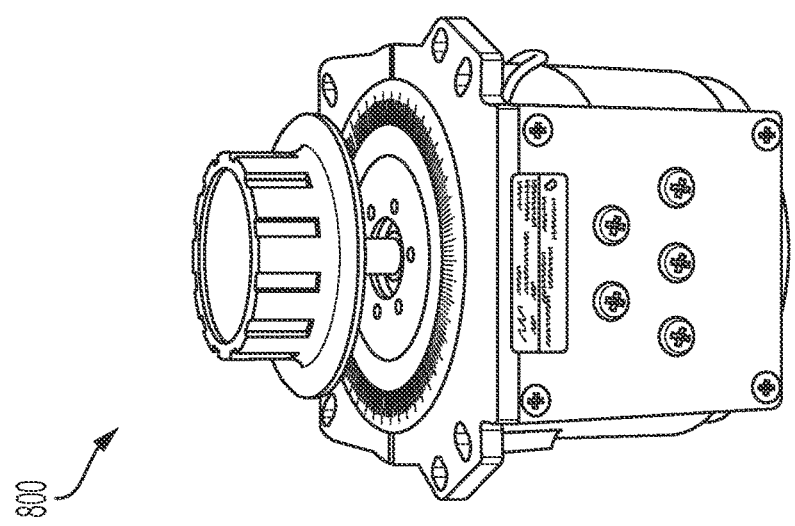

Prior art FIGS. 8A and 8B show a perspective view and a cut view of a known exemplary Superior Electric POWERSTAT® variable voltage transformer (VVT) for controlling variable voltage, current and power which, in particular, may provide continuously adjustable output voltage with varying load (at the output) and varying voltage when detected at the input and fed forward to the VVT by a voltage regulator. The knob shown in FIG. 8A increases the voltage, for example, via a servo motor (not shown) as a sensor notices a varying rotational speed at a harnessing module. Similarly, a variable voltage transformer (VVT) may receive a feedback signal of voltage delivered to a variable load and so vary the voltage delivered to a variable load. Cut view FIG. 8B shows the various components of a POWERSTAT VVT comprising a shaft for varying the voltage, a brush, a coil and core and terminals as see in FIG. 8A including one for a servo motor control.

Figure 9A:
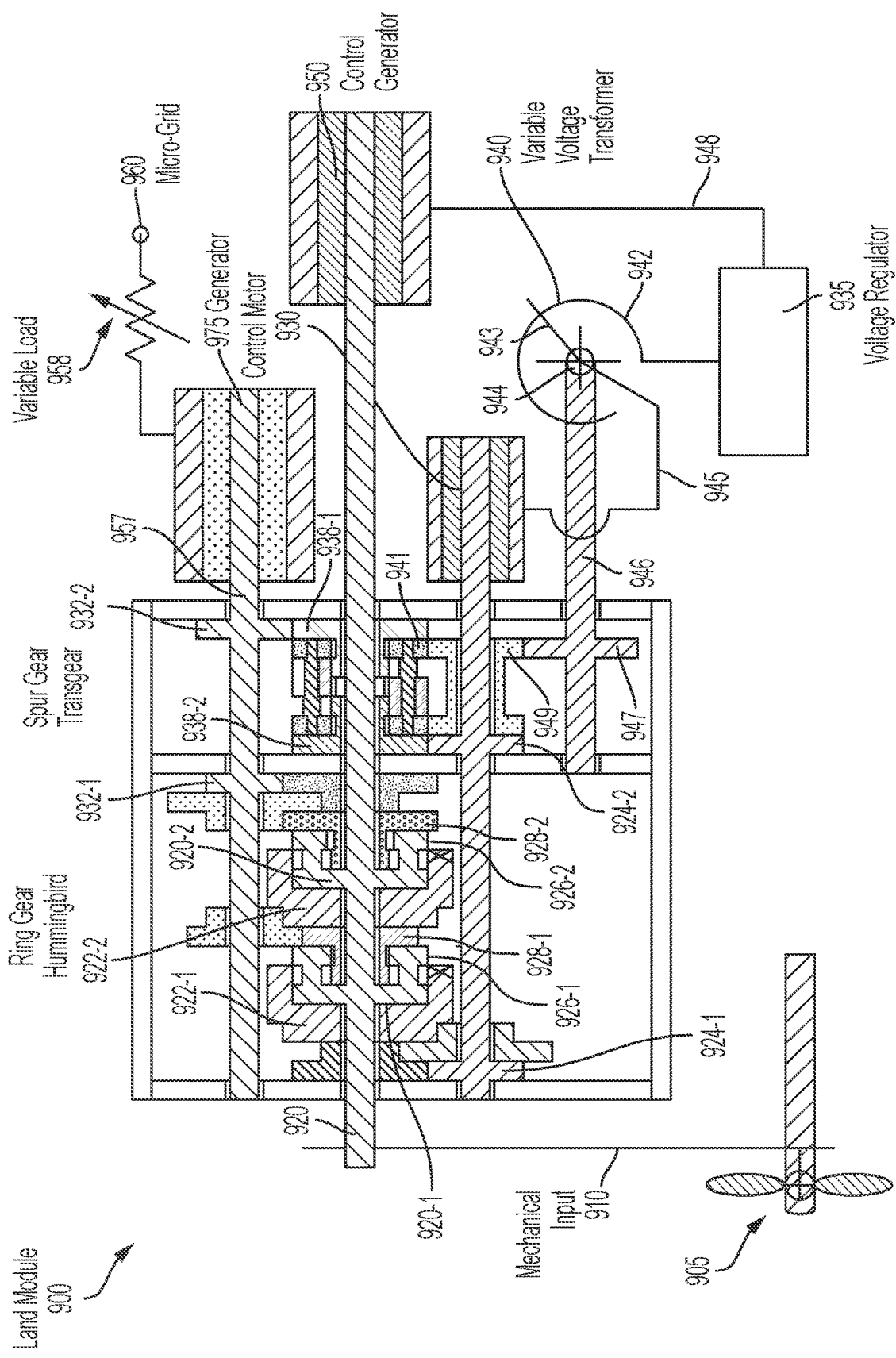
Figure 9B:
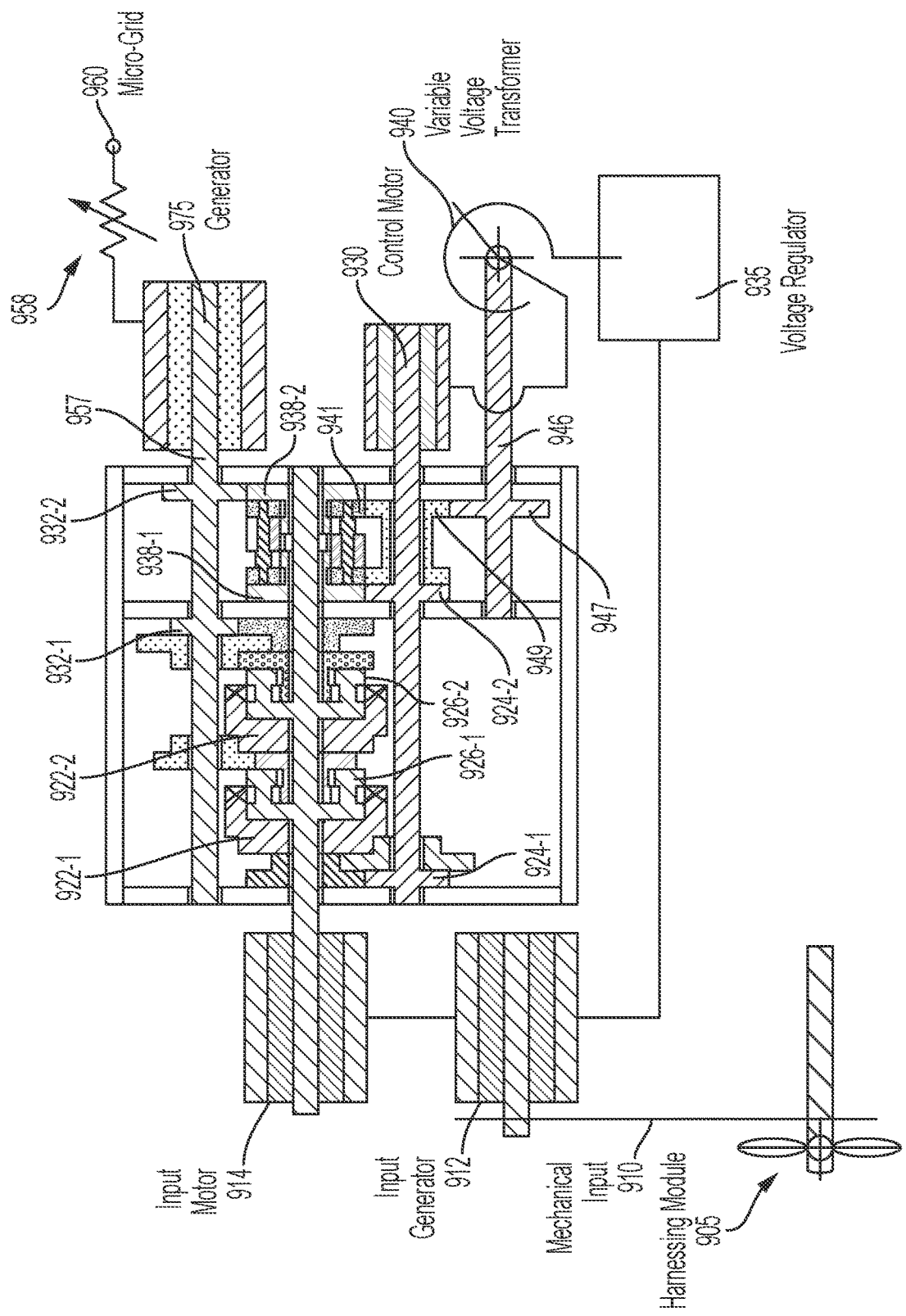

Embodiments of control modules that are mechanically connected to a land module of a hydrokinetic renewable energy source are shown in FIGS. 9A and 9B.

FIG. 9A shows an embodiment of a controlling and generating (C&G) module comprising a Hummingbird gear assembly of first and second ring gears 922-1, 922-2 (of Ring Gear Hummingbird) and a spur/helical gear assembly referred to herein as a (Spur Gear Transgear) gear assembly. The Hummingbird ring gear assembly may have a mechanical input 910 connection from a wind or water harnessing module 905 shown as a propeller via a vertical line (which may comprise a chain or a set of bevel gears, Mechanical Input 910) to shaft 920 of control generator 950. FIG. 9A also shows a feedforward/feedback path to/from a variable load 958 via a first shaft gear 932-1 for feedforward and a second shaft gear 932-2 of the generator shaft 957 indirectly providing feedback to a shaft gear 947 of a shaft 946 of a variable voltage transformer 940 connected to a voltage regulator 935 and control motor 930 where the voltage regulator 935 is also connected to a control generator 950. The feedback control path/circuit is called Kingfisher-T (transgear-controlled); (see, also, FIG. 10C for an example of a Kingfisher-T 1003). FIG. 9A shows an embodiment of a controlling and generating (C&G) module comprising a Hummingbird gear assembly of first and second ring gears 922-1, 922-2 (Ring Gear Hummingbird) and a spur/helical gear assembly referred to herein as a (Spur Gear Transgear) gear assembly. The Hummingbird ring gear assembly may have a mechanical input 910 connection from a wind or water harnessing module 905 via a vertical line (which may comprise a chain or a set of bevel gears, Mechanical Input 910) to shaft 920 of control generator 950. FIG. 9A also shows a feedforward/feedback path to/from a variable load 958 via a first shaft gear 932-1 and a second shaft gear 932-2 of the generator shaft 957 indirectly providing feedback to a shaft gear 947 of a shaft 946 of a variable voltage transformer 940 connected to a voltage regulator 935 and control motor 930 where the voltage regulator 935 is also connected to a control generator 950. The feedback control path/circuit is called Kingfisher-T (transgear-controlled); (see, also, FIG. 10C for an example of a Kingfisher-T 1003).

FIG. 9B shows a similar mechanical input from a harnessing module (horizontal propeller shown) to a land module but an input generator is added for providing electrical power to an input motor and to a control motor via a voltage regulator and a variable voltage transformer.

Figure 9C:
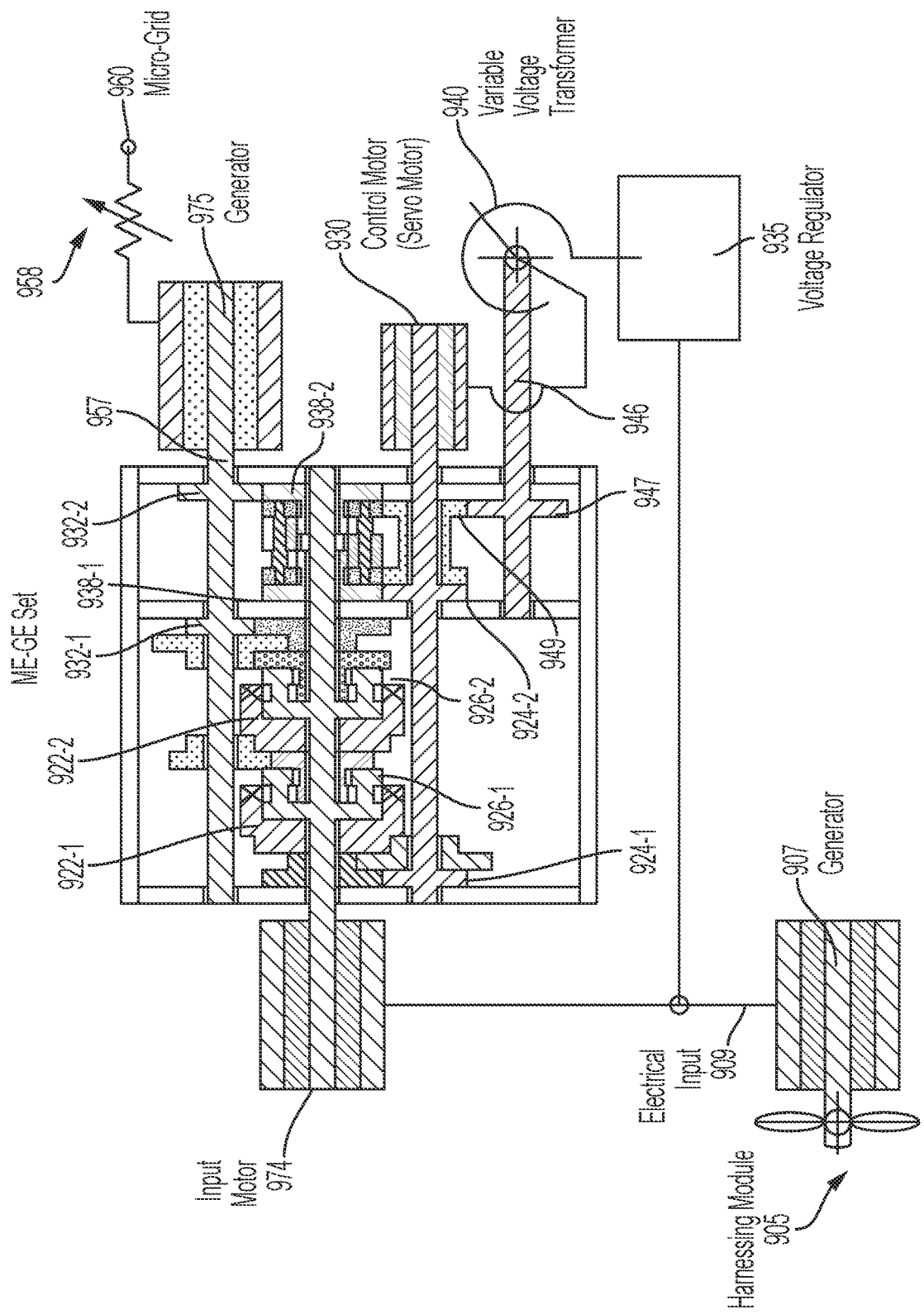

FIG. 9C shows an electrical input where a harnessing module 905 is connected to a generator 907 for generating variable electrical input motor. The electrical input 909 is fed to a control motor via a voltage regulator and a variable voltage transmitter. The electrical input is also fed to an input motor 974 for driving output generator 975.

Figure 10A:
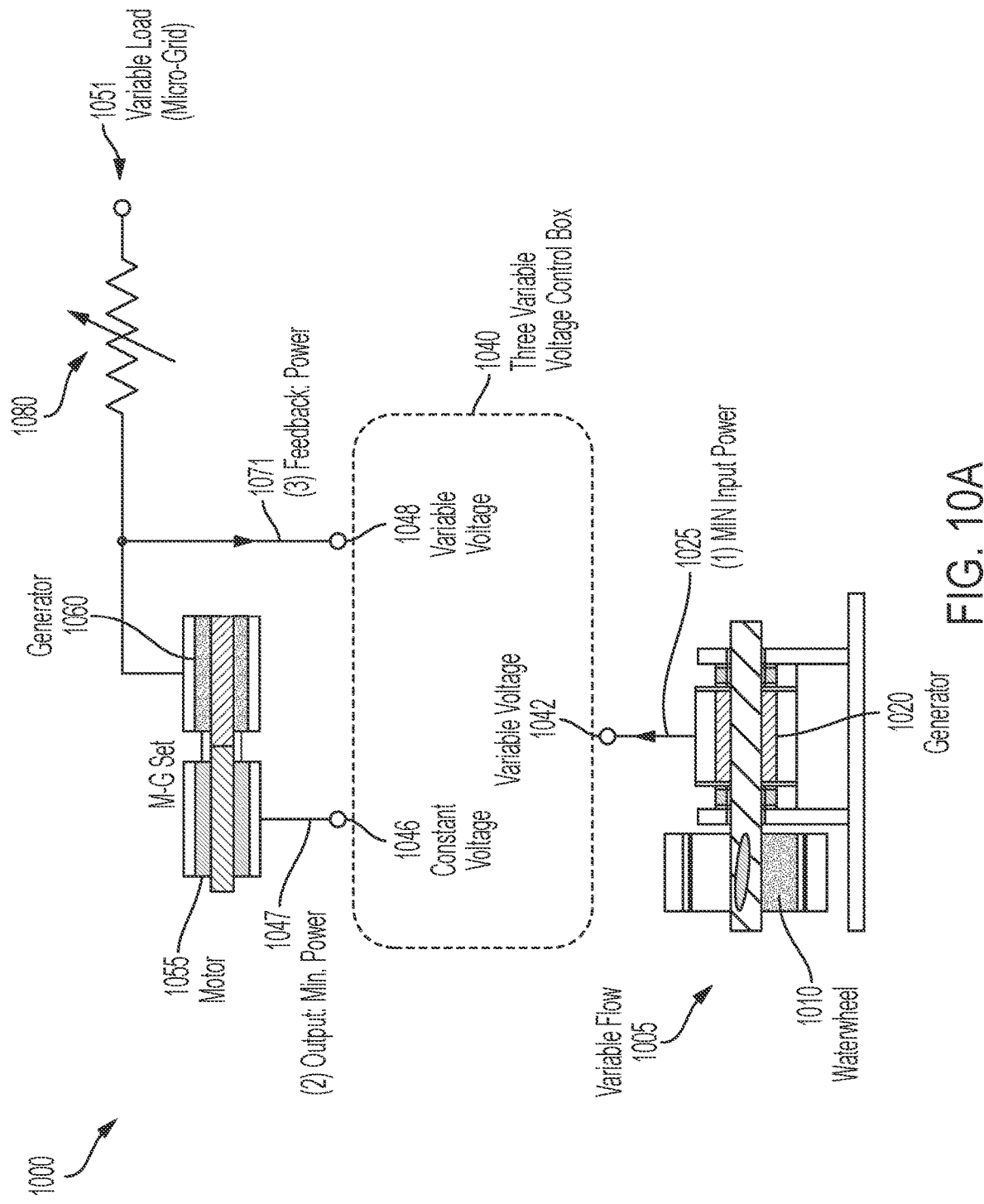

FIG. 10A shows the concept of a voltage converter with a motor generator set (M-G set) 1055, 1060 providing constant power to a variable load with feedback from the variable load as to power usage. A harnessing module receives variable water flow 1005 from the left comprising a variable speed concentric wing assembly combined with an electricity generator providing variable electrical input power ((1) Input: Power) to a three variable control box. A second variable is constant output power ((2) Output: Power) provided to the motor generator set and a third variable is variable voltage feedback ((3) Feedback: Power) to the three variable voltage control box for sensing a variable load of an electricity micro-grid and a variable input power due to variable water flow for assuring a constant voltage output variable.

Figure 10B:
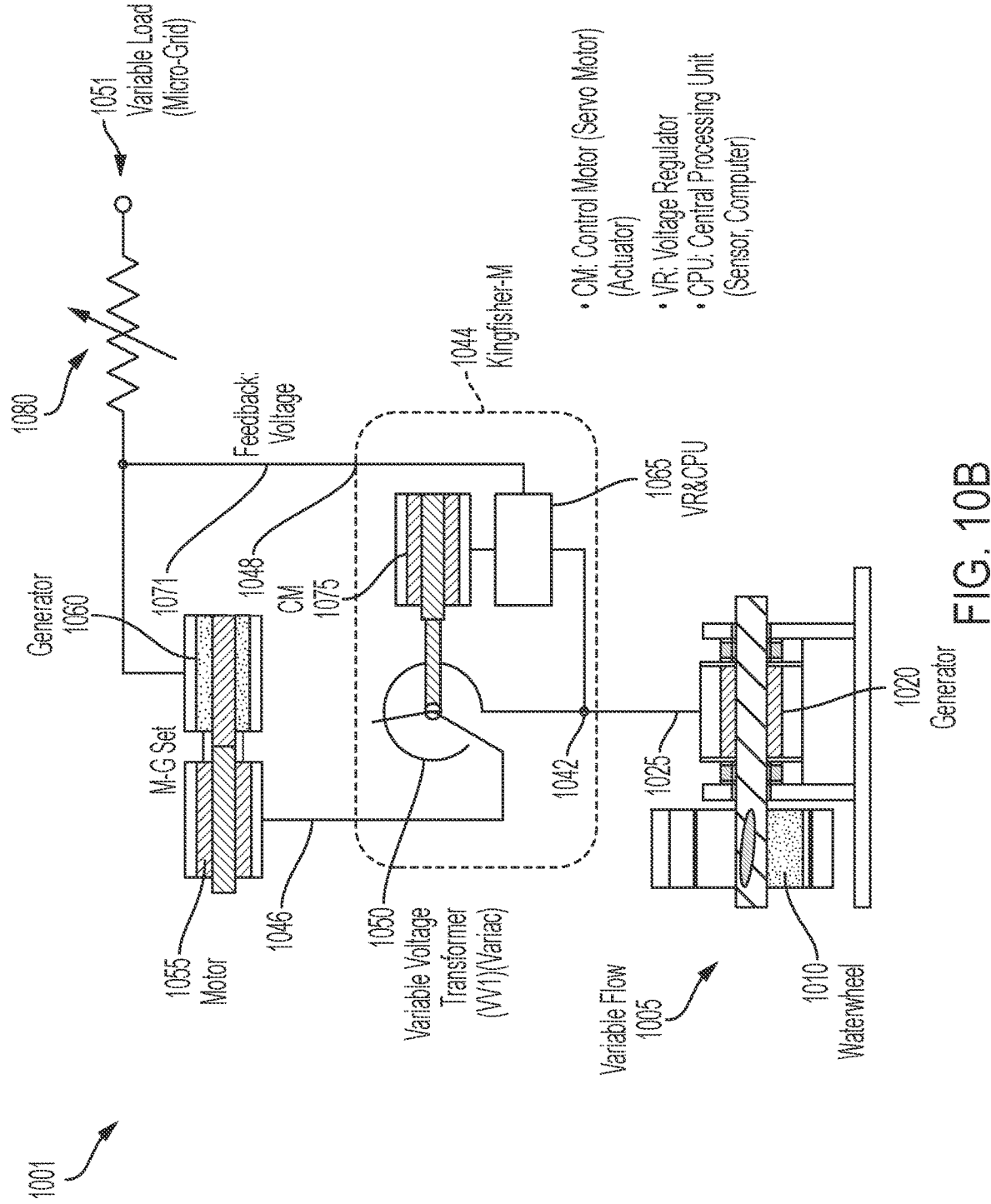

FIG. 10B shows a harnessing module comprising a concentric wing assembly/generator receiving variable water flow from the left for providing a variable voltage input by a flexible electric cable to a variable voltage transformer/control motor/voltage regulator and central processing unit referred to herein as a motor-controlled Kingfisher-M three variable control with feedforward input electric power, output power from a motor/generator set and feedback of a variable load condition to the voltage regulator and central processing unit. The Kingfisher-M receives a feedback voltage sensed at the voltage regulator which also receives a feed-forward variable voltage from the harnessing module/generator combination. The voltage regulator inputs the feed-forward and feed-back voltages processed by the computer as a comparator to the control motor (for example, a servo-motor) as an input via a shaft of the variable voltage transformer.

Figure 10C:
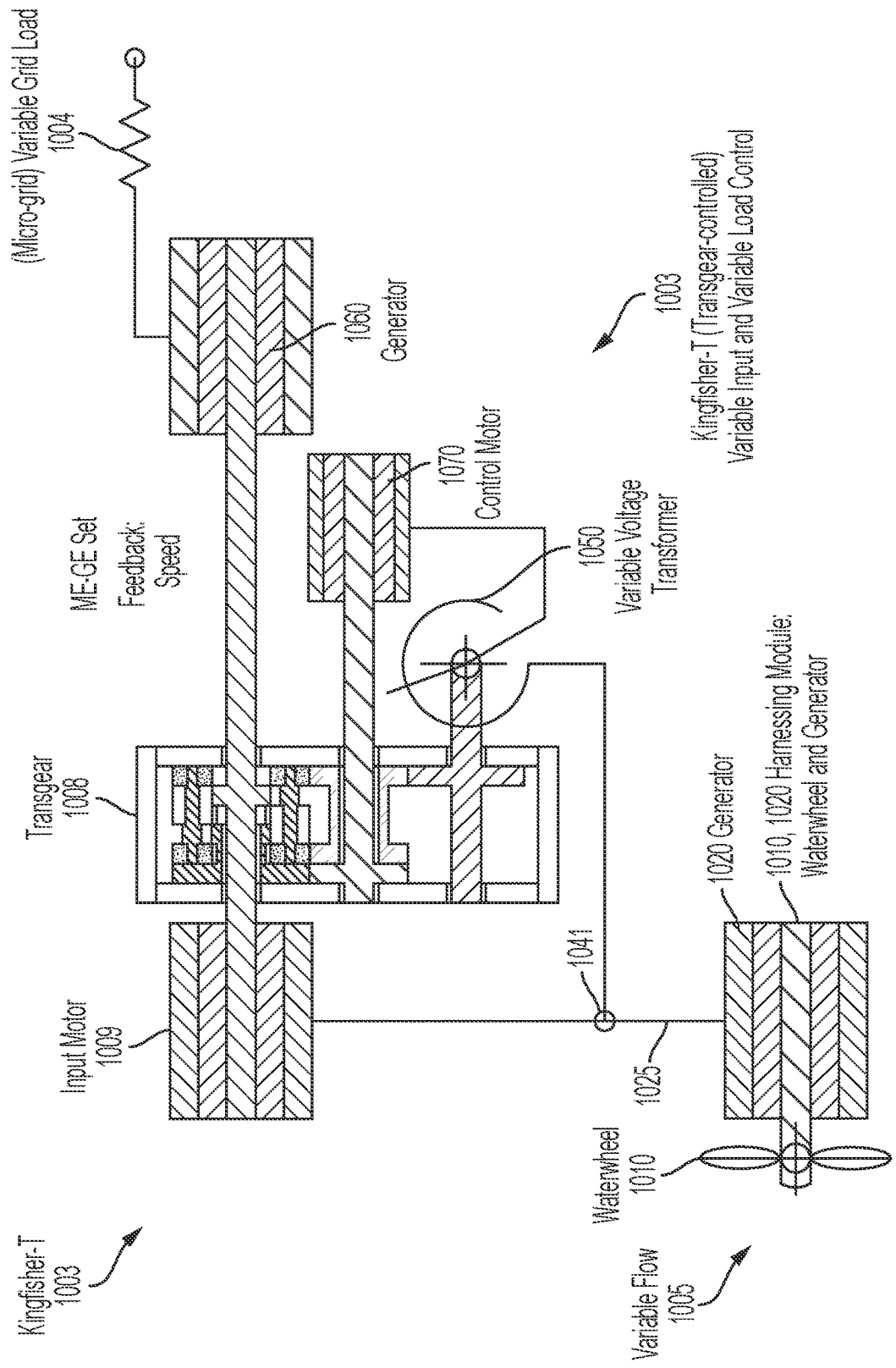

FIG. 10C shows introduces an embodiment which receives a variable voltage input from a harnessing module/generator combination receiving variable water flow from the left via a flexible electrical cable input to a control and generating module which receives a feed-forward and a feedback signal to Kingfisher-T or Transgear (spur/helical gear) assembly module where the Transgear assembly receives variable input voltage from an input motor, a control motor is regulated by a variable voltage transformer having a control shaft connected to the Transgear gear assembly and a feedback of rotational speed of an electricity generator as well as a feedforward variable harnessed input power is also provided via the variable voltage transformer to the Transgear gear assembly of the Kingfisher-T embodiment.

Figure 10D:
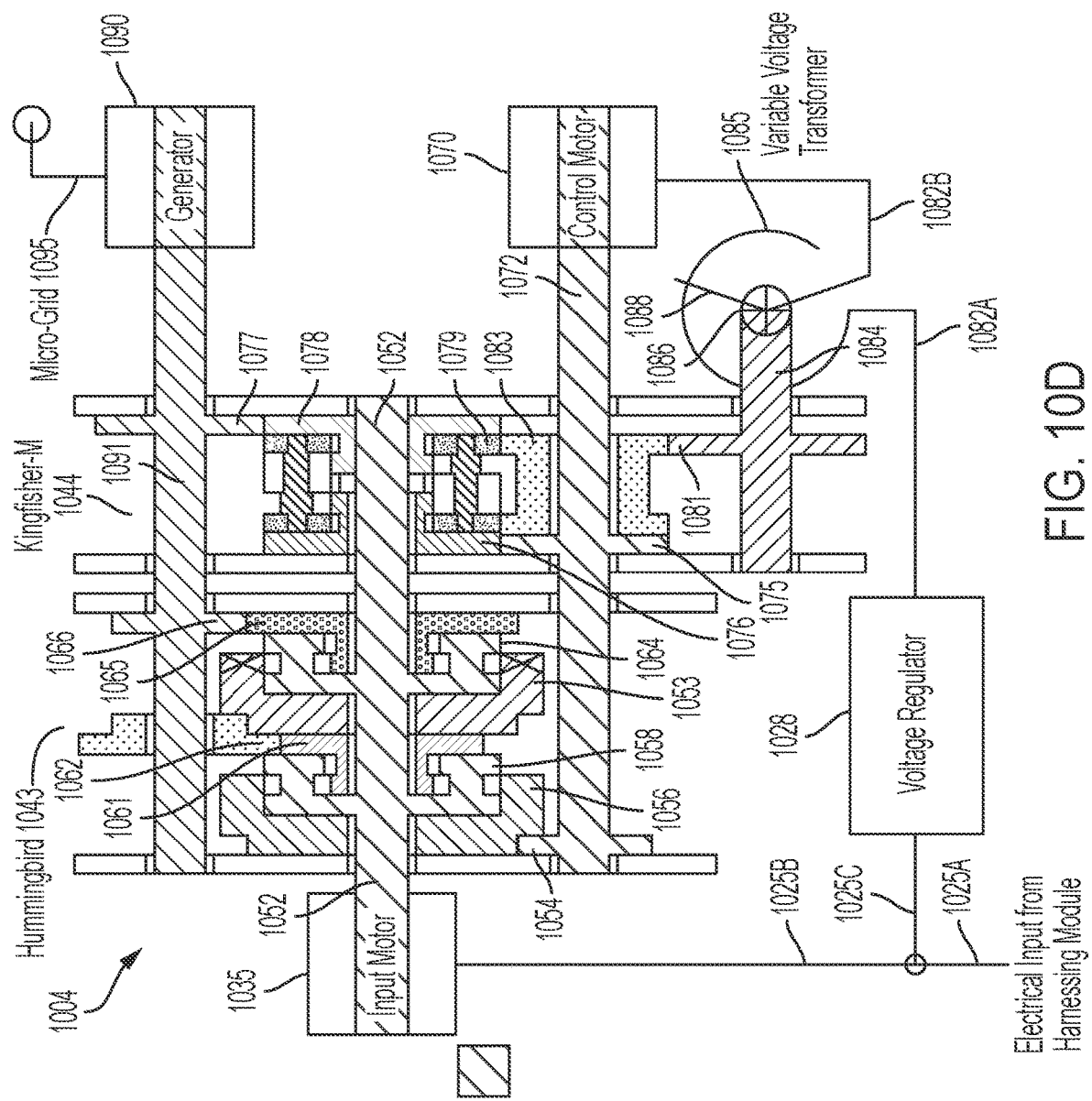

FIG. 10D shows a two speed converter control and generating module embodiment comprising Hummingbird and Kingfisher control. Variable electric input voltage from a harnessing module/generator combination (not shown) is input by a flexible electric cable, for example, to a control and generator module comprising an input motor having a motor shaft that is connected to a dual ring gear assembly Hummingbird which drives an output generator at constant frequency and to a Kingfisher. The Kingfisher receives generator rotational speed input as a feedback signal. A voltage regulator and a variable voltage transformer receive a feedforward signal from the electrical input from the harnessing module/generator combination. A control motor provides a control motor rotational speed input via a control motor shaft having sun gears connecting to the first ring gear of the Hummingbird and connecting to the input sun disc/sleeve/sun gear of the Kingfisher. This is an example of a "motor equivalent" and "generator equivalent" set (ME-GE Set).

Figure 11:
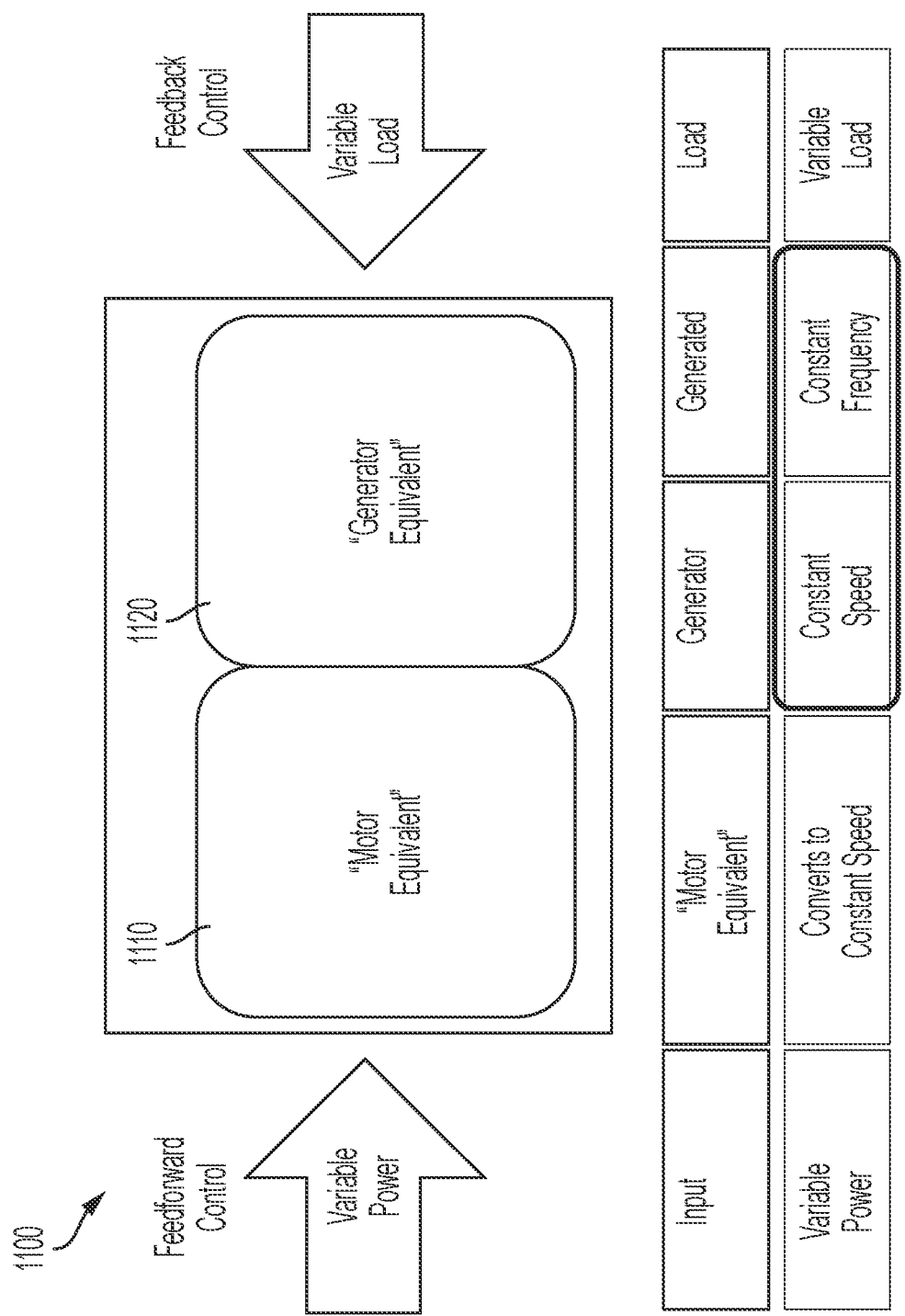

FIG. 11 shows the concept of a "generator equivalent" which may be combined with a "motor equivalent." A variable load condition causing variable electrical frequency may be sensed at the "generator equivalent" to assure constant electrical frequency at a "motor equivalent"/"generator equivalent" combination. Also, a variable input power may be provided to the "motor equivalent" to convert the variable power to constant speed for driving the "generator equivalent."

Figure 12:
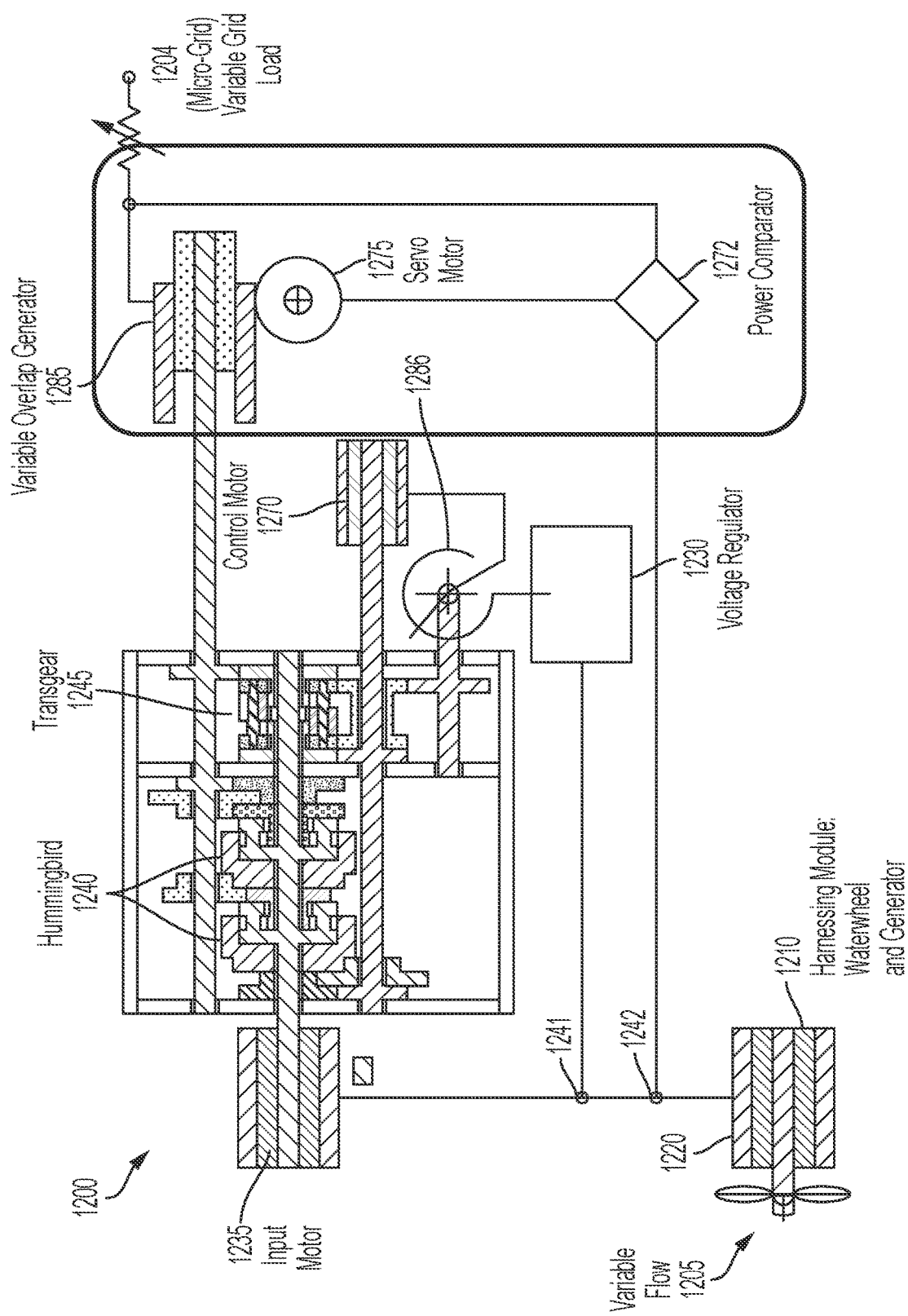

FIG. 12 shows harnessing more than rated power by adjusting a control motor speed with feedforward control from the harnessing module/generator combination and feedback control from the variable load compared at a power comparator. A control and generating module may comprise a Hummingbird two ring gear speed converter and a spur helical gear assembly (Transgear gear assembly).

Figure 13A:
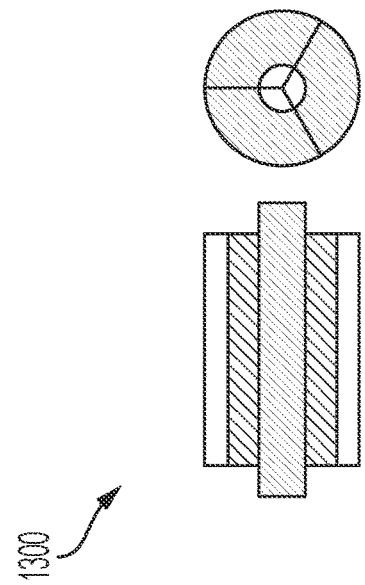
Figure 13A:
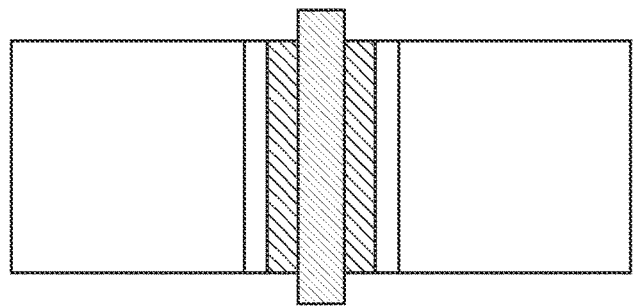
Figure 13A:
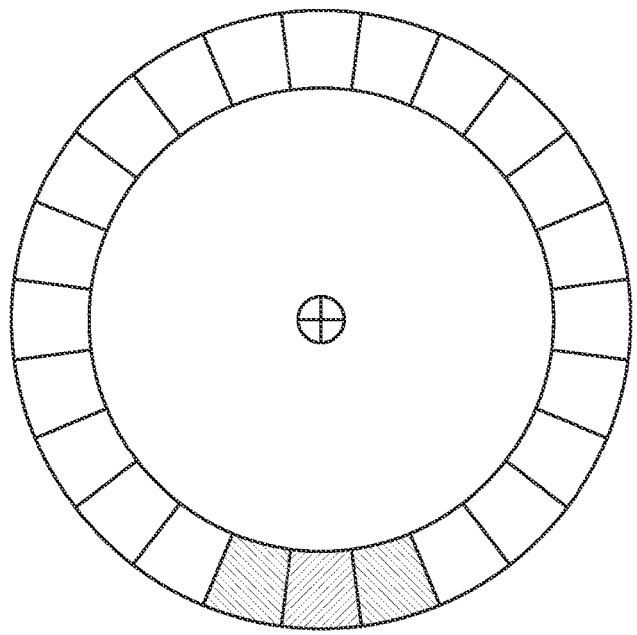
Figure 13B:
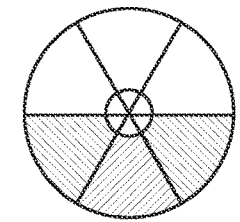
Figure 13C:
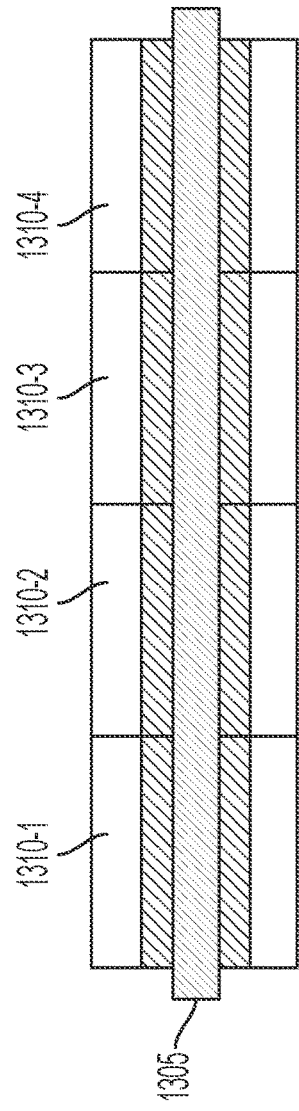

FIGS. 13A, 13B and 13C show embodiments of an application of providing multiple sets of poles added axially in FIG. 13C by, for example, four generators, each having multiple sets of poles, for example, six poles for each generator versus, per FIG. 13B, having a single large circumference generator having twenty-four poles. In an exaggerated case (not shown) FIGS. 13B and 13C show how a known generator having three poles times twenty or sixty poles having an increased diameter (similar to prior art FIG. 13B) may be replaced by a small diameter set of, for example, four generators in line (FIG. 13C), each having fifteen poles or sixty poles equivalent to the large diameter sixty pole generator (FIG. 13B).

Figure 14:
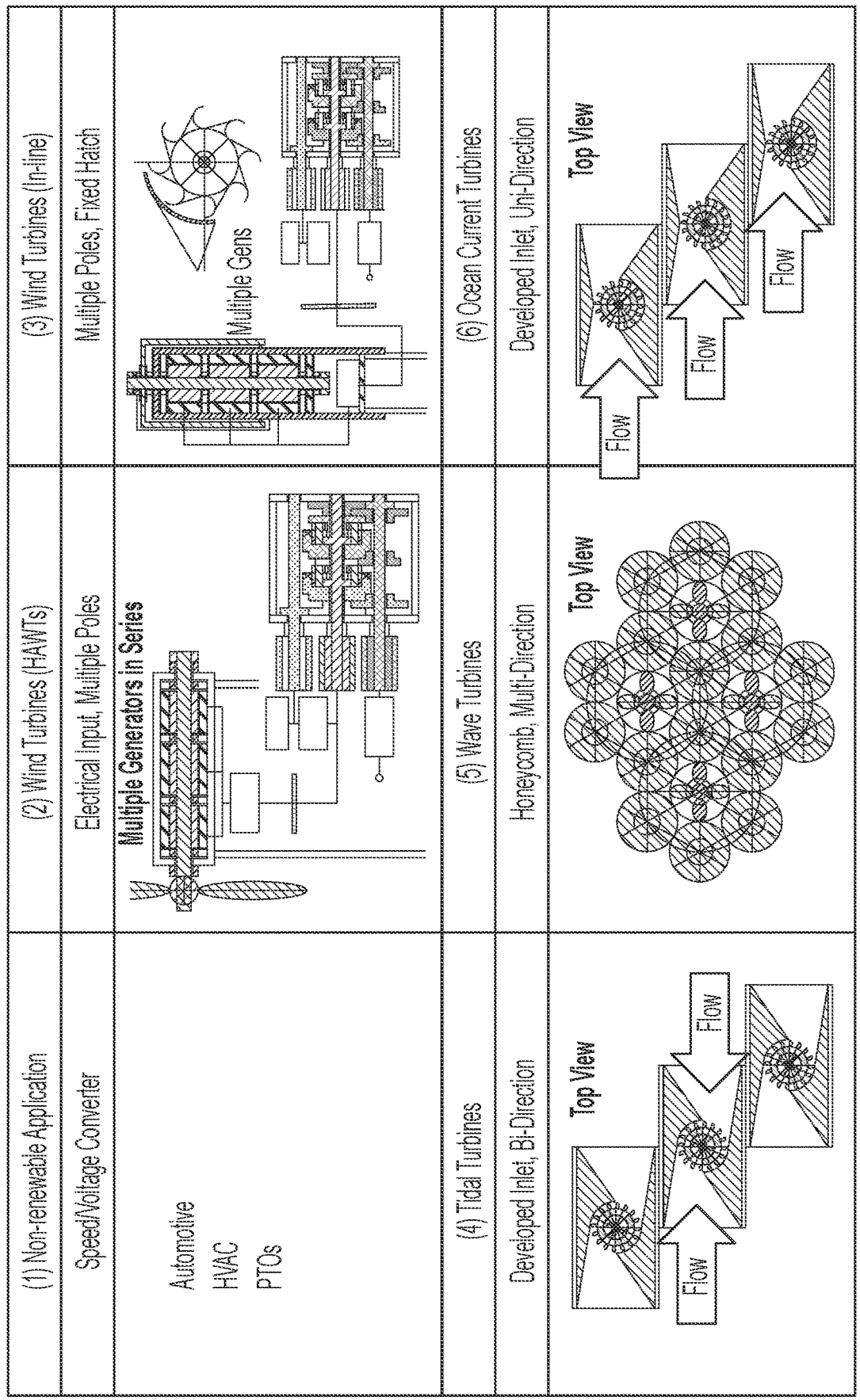

FIG. 14 shows six different embodiments of harnessing modules in combinations or for various uses. Where the first of six concepts ((1) Non-renewable applications) is a usage of a speed/voltage converter for automotive (transmissions), HVAC (compressor controls) and power-take-off applications. The second of six concepts ((2) Wind Turbines (HAWTS)) is use in HAWT (horizontal wind turbines) with multiple generators such as three generators in series driven by a horizontal wind flow. The third concept ((3) Wind Turbines (In-line) is use in VAWT (vertical wind turbines) where three generators are shown vertically arranged to receive wind from a fixed hatch and variable electricity delivery to a control and generating module. The fourth concept ((4) Tidal Turbines) is use in tidal turbines where the harnessing modules are in parallel. These turbines in a top view are shown for use in a developed water inlet and receive water in two directions per day, during low to high tide and from high to low tide. In an ocean wave turbine fifth concept (5), a honeycomb of wave turbines seen in top view may harness energy from waves in multiple directions. A sixth concept ((6) ocean current turbines) is for use in ocean current turbines where ocean current flow is shown in one direction to three harnessing modules in parallel crossing the ocean current.

Figure 15:
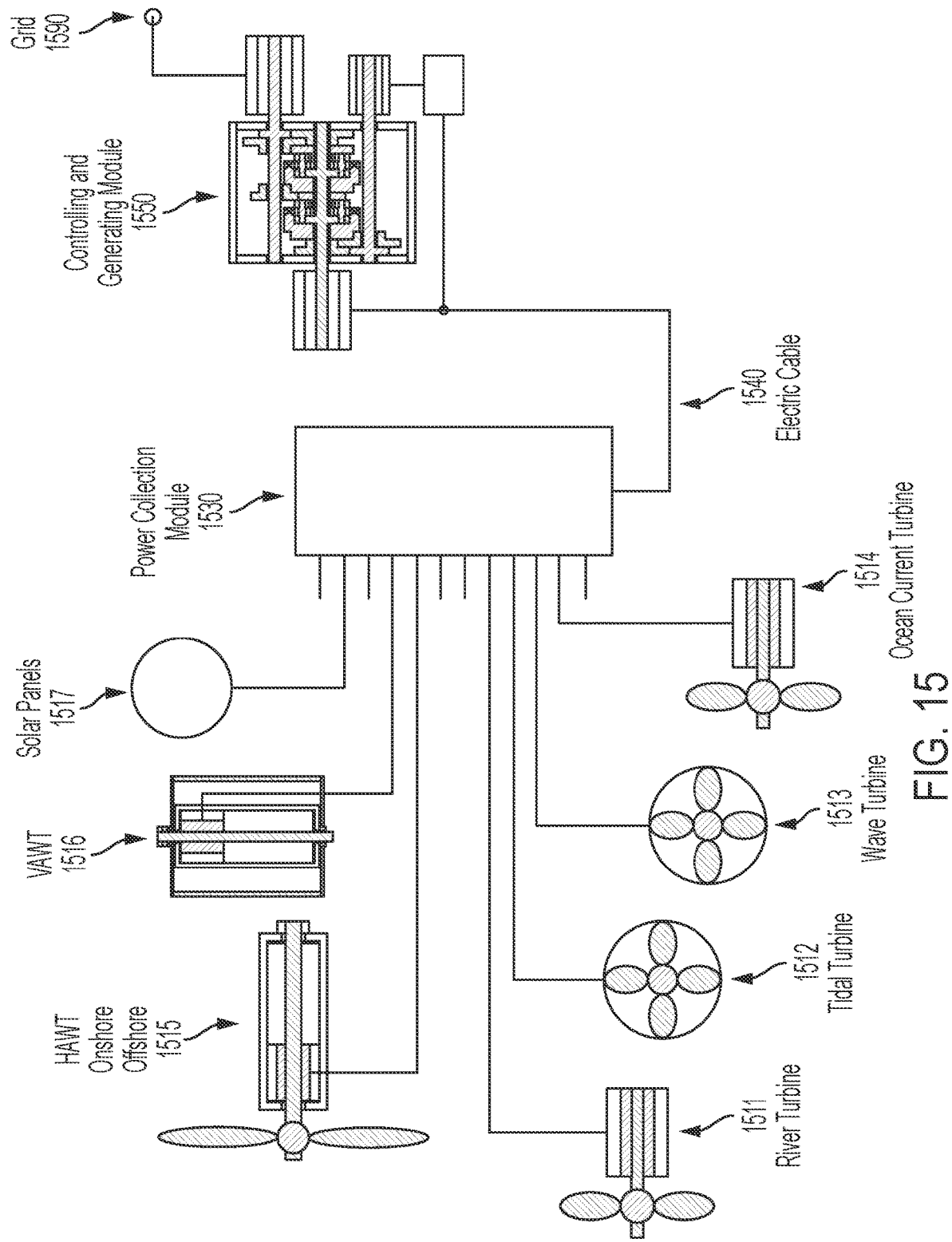

FIG. 15 shows the concept of providing various electrical inputs from, for example, renewable energy sources to a power collection (and switching station) where the combined or selected electrical inputs fed by electrical cable from different renewable energy sources as well as other sources (not shown) may be collected (and switched) to one or more control and generating modules to an electric grid having varying load. Samples are considered having three variables and different "Hummingbird" and "Kingfisher" varieties of simpler and more complex forms constructed and tested. These Hummingbird/Kingfisher control varieties of variable to constant frequency and voltage control all provide mechanical synchronization of variable input to constant output and efficient mechanical control of speed, for example, operating at a multiple of 50 Hz (European) or 60 Hz (US) to generate constant voltage and constant power at constant alternating current frequency and the like.

These and other features of the present invention will be described in the detailed description of the invention and depicted in the accompanying drawings.

DETAILED DESCRIPTION

Figures 1A, 1B:
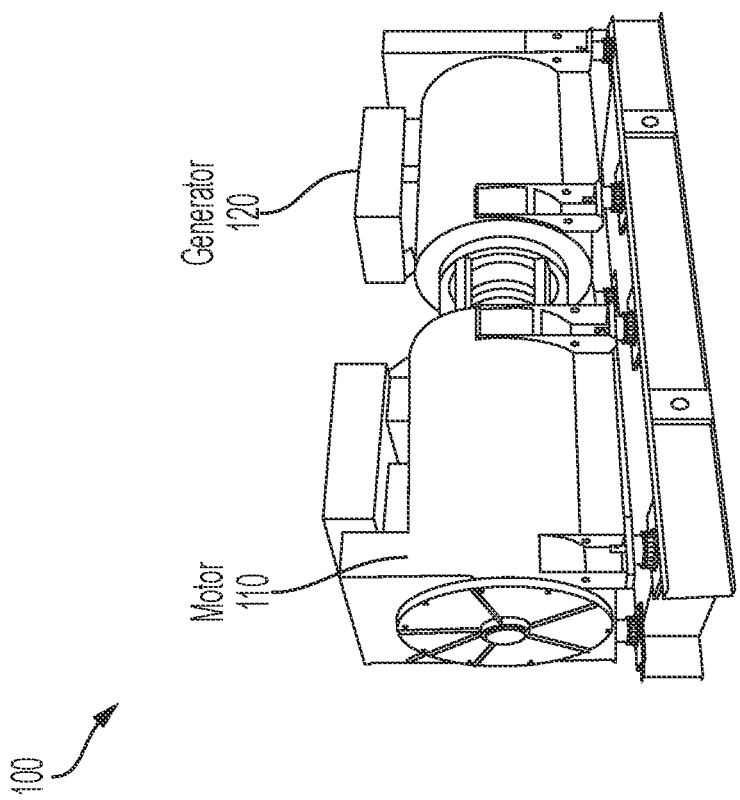
FIGS. 1A through 1C are examples of a motor generator set (M-G set).
Figure 1C:
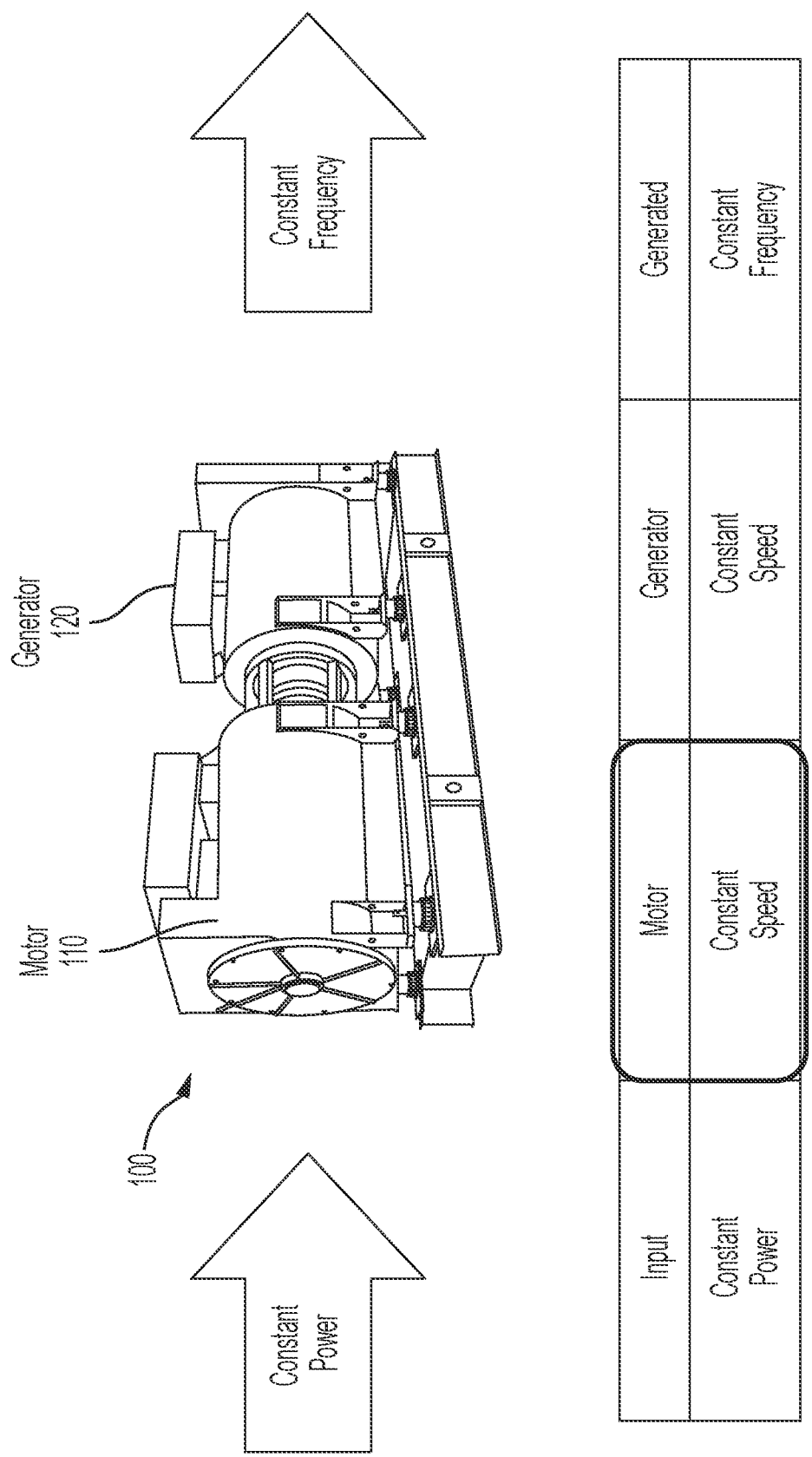

In the figures of the present embodiments of the invention comprising FIGS. 1A through 15, an effort has been made to follow a convention such that the first reference number for a drawing component such as 1XX indicates a figure number as the first digit where the element first appears; for example, Motor 110 and generator 120 first appear in FIG. 1A and also appears in FIG. 1B.

FIG. 1A through FIG. 8B refer to the prior art while FIGS. 9A through 15 provide examples of the use of mechanical and electrical connections among harnessing modules, control modules and generator modules as well as the introduction of electrical connections to a land module connected by flexible electrical cable to land module combinations of voltage regulators, input motors, Hummingbird speed converters, voltage regulators, variable voltage transformers, control motors, servo-motor controlled Kingfisher-M speed converters, Kingfisher-T Transgear assembly (spur/helical gear assembly) controlled speed converters and three additional embodiments of combinations of harnessing modules, land modules and uses with other forms of renewable and engine powered three variable control land modules.

FIG. 9A further shows an embodiment of a control and generating module (Land Module 900) comprising a Hummingbird gear assembly of first and second ring gears (of Ring Gear Hummingbird) and a spur/helical gear assembly (Spur Gear Transgear) referred to herein as a Transgear gear assembly. The Hummingbird ring gear assembly named for first and second ring gears 922-1 and 922-2 may have a (vertical line) mechanical input 910 connection from a harnessing module 905 (propeller shown) via the vertical line (which may comprise a chain or a set of bevel gears) to control generator shaft 920 having first and second carrier gear assemblies 920-1 and 920-2 including carrier gears 926-1, 926-2. A first shaft gear 932-1 of generator shaft 957 of generator 975 meshes with a first unnumbered sleeve/sun gear via unnumbered connecting gears to right sun gear 928-2. Second shaft gear 932-2 meshes with right sun gear 938-1 of the Spur Gear Transgear. FIG. 9A thus shows a feedback path/circuit from a variable load 958 via the second shaft gear 932-2 of the generator shaft 957 indirectly meshed to a shaft gear 947 of a shaft 946 turning shaft end 944 to turn brush 943 to vary voltage from a lead 945 to core 942 of a variable voltage transformer 940 connected to a voltage regulator 935 and control motor (Control Motor 930). The voltage regulator 935 is thus connected between control motor 930, variable voltage transformer 940 and a control generator 950. Mechanical connection input 910 from harnessing module 905 may comprise a chain drive or an assembly of bevel gears (neither shown). The harnessing module 905, exemplified by a wind or water propeller and propeller shaft, turns at a variable rotational speed determined by water or wind flow direction and speed. The variable rotational speed input (mechanical input 910) is delivered to a shaft 920 of control generator 950 which has first and second carrier gear assemblies 920-1, 920-2 integral with shaft 920 and meshed to ring gear assemblies 922-1, 922-2 respectively. Control generator 950 generates sufficient electrical power so that a voltage regulator 935 may derive an electrical voltage for delivery via core 942 of the variable voltage transformer 940 to be passed by brush 943 output via a lead 945 to control motor 930 for controlling Ring Gear Hummingbird so that generator 975 may generate constant frequency output at 60 Hz. As long as the variable load 958 is remaining at a constant value, the Ring Gear Hummingbird delivers a constant frequency. If the variable load 958 increases, for example, generator 975 speed decreases and so does the frequency. Connecting gear 949 is meshed with a carrier gear assembly 941 of the spur/helical Transgear assembly to prevent/adjust the decrease in frequency. Unlabeled planetary gears of the carrier gear assembly 941 mesh with first sun gear/sleeve/sun disc 938-1 and second sun gear/sleeve/sun disc 938-2 where the first sun gear/sleeve/sun/disc 938-1 meshes with the second shaft gear 932-2 of the generator shaft 957 for sensing the rotational speed of generator shaft 957 and generator 975. This second shaft gear 932-2 of the generator shaft 957 provides a feedback path for sensing the rotational speed of generator 975 so that a control module comprising control motor 930), voltage regulator 935, variable voltage transformer (VVT) 940, and control generator 950 may increase or decrease the voltage to control motor 930 to assure a constant rotational speed to generator 975 for producing a constant desired electrical frequency. Second sun gear/sleeve/sun disc 938-2 meshes with shaft gear 924-2 of the shaft of control motor 930. VVT 940 as discussed above receives a feedback signal from generator 975 that can regulate the control motor to also provide a control to control motor shaft gear 924-1, input to Ring Gear Hummingbird, which is meshed to gears leading to the first and second ring gears 922-1 and 922-2. Variable rotational speed input 910 of harnessing module 905 through shaft 920 rotates control generator 950. Generated electricity of generator 975 to micro-grid 960 is indirectly received via lead 948 between voltage regulator 935 and control generator 950. The regulated voltage is going through VVT 940 (1 to 1 ratio) and rotates control motor 930 shaft gear 924-1 so that the first and second ring gear Hummingbird speed converter (Ring Gear Hummingbird) and the Spur Gear Transgear deliver rotational speed for generator 975 to produce, for example, constant 60 Hertz electricity regardless of variable load 958. The second ring gear 922-2 provides an output practically constant output speed via sun gear/sleeve/sun disc 928-2 to first shaft gear 932-1 of shaft 957 which turns generator 975 to produce at least a minimum baseload electric power under feedback control via second shaft gear 932-2 of the generator shaft 957 indirectly connected to control motor shaft gear 924-2 via carrier gear assembly 941 at constant electric frequency to variable load 958 and to micro-grid 960 via generator 975.

FIG. 9B shows a similar mechanical input from a harnessing module 905 (horizontal propeller shown) for harnessing wind and water renewable energy as FIG. 9A. However, in this exemplary embodiment, the mechanical input 910 by chain or bevel gears is provided to a land module input generator 912 for providing electric power to an input motor 914 and to a control motor 930 via a voltage regulator 935 and a variable voltage transformer (VVT) 940. In this manner, the land module or controlling and generating module (C&G module) may have electrical input in place of the mechanical input 910 shown. As in FIG. 9A, the harnessing module 905 may receive variable renewable energy from water or wind flow and direction.

Input motor 914 of FIG. 9B provides a variable rotational output speed that is controlled to a constant speed by control motor 930. In the embodiment of FIG. 9B, the components first ring gear 922-1, second ring gear 922-2, first gear 924-1 of the shaft of the control motor 930, second gear 924-2 of the shaft of the control motor 930, first carrier gear assembly 926-1, second carrier gear assembly 926-2, first shaft gear 932-1 of the generator shaft 957, second shaft gear 932-2 of the generator shaft 957, voltage regulator 935, variable voltage transformer 940, an unnumbered connecting lead from the voltage regulator 935 to the input generator 912, shaft 946 of the variable voltage transformer VVT 940, VVT shaft gear 947, variable load 958, micro-grid 960 are connected or meshed in the same way as in FIG. 9A. Thus, the generator 975 rotational speed is sensed by second shaft gear 932-2 of generator shaft 957 which provides a mechanical means of providing feedback from the variable load 958 and micro-grid 960 conditions. A feedback signal is thus provided to control motor 930 in combination with the feedforward signal from input generator 912 to voltage regulator 935 so that a constant rotational speed is maintained by control motor 930 and assures a constant electrical frequency output of generator 975 to the micro-grid 960 with variable load 958 conditions.

FIG. 9C shows an electrical input 909 from a harnessing module 905/propeller/generator combination 905, 907 having an electrical input 909 (for example, via an electrical cable having two branches) one branch connecting to an input motor 974 and the other branch connecting to a voltage regulator 935 and a variable voltage transformer (VVT) 940 to a control motor (for example, a servo motor) 930. Electrical input 909 is thus split to a land module into two paths. One path follows an unnumbered electrical lead from electrical input 909 which operates input motor 974 which drives output generator 975 via the two ring gear assemblies 922-1, 922-2, carrier gear assemblies 926-1 and 926-2 and which connect via a sun gear/sleeve/sun disc and two split gears to a first shaft-sun gear 932-1 of generator 975 shaft 957. The other path leads to voltage regulator 935 and variable voltage transformer 940 as a feedforward signal from the harnessing module 905 and generator 907 combination of the variable input rotational speed of generator 907 and more importantly, its electrical input 909 to a "motor equivalent" and "generator equivalent" set (ME-GE set). As in FIGS. 9A and 9B, the components first ring gear 922-1, second ring gear 922-2, first control motor shaft gear 924-1, second control motor shaft gear 924-2, first carrier gear assembly 926-1, second carrier gear assembly 926-2, first shaft gear 932-1 of generator shaft 957, control motor 930, second generator shaft gear 932-2 of generator shaft 957, voltage regulator 935, variable voltage transformer 940, VVT shaft 946, VVT shaft gear 947, connecting gear 949, generator shaft 957, variable load 958, and micro-grid 960 all are meshed or connected in the same way as in FIG. 9B.

FIG. 10A shows the alternate concept 1000 of a voltage converter with a motor generator (M-G) set comprising motor 1055; and generator 1060 having a three variable voltage control box 1040. FIG. 10A shows a harnessing module (concentric wing waterwheel 1010) comprising a variable speed concentric wing assembly combined with an electricity generator 1020 receiving a horizontal variable water flow 1005 from the left, variable flow 1005, as a renewable energy input providing variable input power to a three variable control box 1040 via cable 1025 comprising at least minimum (1) Min Input Power to variable voltage terminal 1042. Generated minimum input electric power from harnessing module waterwheel 1010/generator 1020 on cable 1025 at a minimum variable flow rate 1005 output of generator 1020 is delivered to motor 1055 of M-G set 1055, 1060 so that generator 1060 of the M-G set may produce constant frequency 60 Hz output despite a variable load 1080. A first variable ((1) Input: Minimum Input Power received on cable 1025) is the baseload minimum input electric power recovered from the variable water flow and direction 1005 by the waterwheel 1010 and generator 1020. A second variable ((2) Output: min output power on cable 1047) is output power (2) at constant voltage terminal 1046 provided to the motor generator set (M-G set) 1055, 1060 and a third variable (3) Feedback: Power received on cable 1071 is variable voltage delivered at terminal 1048 from variable load 1080 represented by micro-grid 1051 to the three variable voltage control box 1040 for sensing the variable load 1080 of a variable load (micro-grid) 1051 for assuring a feedback variable voltage at terminal 1048. A three variable voltage control box 1040 thus receives (1) MIN input power from a harnessing module (waterwheel)/generator 1010, 1020 via electrical cable 1025 and (2) Min. outputting power (constant voltage from terminal 1046 on cable 1047 via M-G Set 1055, 1060 to a variable load 1080 with (3) feedback: power being received via cable 1071 at terminal 1048 (variable voltage because of variable load 1080 of micro-grid 1051). A harnessing module waterwheel 1010 and generator 1020 deliver a minimum input power (1) via electrical cable 1025 as variable voltage at terminal 1042 received at three variable control box 1040. A variable voltage at terminal 1048 is received via cable 1071 as feedback: power (3) as a control variable. Constant voltage output at terminal 1046 ((2) output: min. power) is delivered to operate a motor generator set 1055, 1060 for delivering constant power to a variable load 1080 controlled to be constant by (3) feedback: power). This figure demonstrates some of the principles of FIGS. 9A through 9C including a feedback signal delivered by cable 1071 to assure a constant electrical frequency output to micro-grid 1051.

FIG. 10B shows an implementation 1001 of a voltage converter Kingfisher-M (control motor feedback controlled) 1044 via control motor (CM) 1075 with an M-G set 1055, 1060. The three variables of Kingfisher-M 1044 are (1) a variable input signal on cable 1025 from the harnessing module/generator 1010, 1020, (2) an output power on cable 1046 received at motor generator (M-G) set 1055, 1060 and (3) a feedback voltage signal on cable 1071 received at terminal 1048 to voltage regulator and central processing unit (VR & CPU) 1065. More particularly, FIG. 10B shows a harnessing module comprising a concentric wing assembly (waterwheel) 1010/generator 1020 for providing a variable voltage input by a flexible electric cable 1025 via terminal 1042 to a voltage regulator and central processing unit 1065/variable voltage transformer 1050/control motor 1075 referred to herein as a control motor-controlled Kingfisher-M 1044. Variable voltage transformer 1050 is calibrated at 1:1. The Kingfisher-M 1044 receives a feedback voltage on cable 1071 sensed at the voltage regulator and central processing unit 1065 which also receives a feed-forward variable voltage from terminal 1042 receiving variable voltage on cable 1025 from the harnessing module waterwheel 1010/generator 1020 combination to the voltage regulator/central processing unit 1065. The voltage regulator and CPU 1065 input the feed-forward and feed-back voltage to the control motor (CM) 1075 (for example, a servo-motor, actuator) as an input via an unnumbered shaft to the variable voltage transformer (VVT, Variac) 1050. FIG. 10B further shows that with an electrical input via cable 1025 from harnessing module 1010 and generator 1020 may have an electrical input (flexible cable) 1025 to the Kingfisher-M 1044 at terminal 1042. Two electrical branches from terminal 1042 are output to variable voltage transformer (VVT) (Variac) 1050 and via electric cable 1046 to motor generator set 1055, 1060 where cable 1046 provides an electrical output signal on cable 1046 to run motor-generator (M-G) set 1055, 1060 at constant rotational speed. Initially VVT 1050 is set so that at the minimum electrical input from the generator 1020 will rotate motor 1055 and generator 1060 to generate constant electrical frequency at 60 Hz. The same electrical input on cable 1025 branches to VR/CPU 1065 to control motor 1075 and the unnumbered control motor shaft is connected to the knob of variable voltage transformer (VVT) 1050. At the minimum input voltage, there will be no output from the control motor 1075. Another branch to the Kingfisher-M 1044 is received from a terminal from micro-grid variable load 1051 as feedback voltage 1071 to servo control motor (CM) 1075 operating the VVT 1050. The feedback voltage is sensed at CPU 1065 and also the feed forward voltage provided as input to VVT 1050 via terminal 1042 for comparison and actuation of control motor 1075 to increase or decrease the voltage provided to control (servo motor) motor 1075.

FIG. 10C introduces an alternate design of a voltage converter with a "motor equivalent"-"generator equivalent" set 1009, 1060 (ME-GE set introduced in FIG. 9C) embodiment which receives a variable voltage input from a harnessing module 1010, 1020 of waterwheel or wind propeller 1010/generator combination 1010, 1020 via a flexible electrical cable 1025 input to a land-based module which receives a feed-forward and a feedback signal to a Kingfisher-T 1003 where the T stands for a Transgear spur/helical gear assembly 1008. The Transgear assembly 1008 (the spur/helical gear assembly having three variables: input motor 1009, control motor 1070 and output from generator 1060) receives variable input voltage from the input motor 1009. The control motor 1070 is regulated by a variable voltage transformer 1050 having a control shaft connected to the Transgear assembly 1008 and a feedback of rotational speed of an electricity generator 1060 is also provided, for example, to the Transgear spur/helical assembly 1008 of a Kingfisher-T 1003 speed converter embodiment. It is important to set variable voltage transformer (VVT) 1050 to rotate control motor 1070 when the generator 1020 of the harnessing module 1010/1020 is providing electricity at the minimum variable flow speed 1005.

Transgear control assembly 1008 of Kingfisher-T 1003 of FIG. 10C comprises control motor 1070 shaft having a shaft gear meshed with a sun disc/sleeve/sun gear meshed with a planetary gear of a carrier gear assembly which has a connecting gear to the variable voltage transformer 1050 shaft. Input from the harnessing module (waterwheel 1010 and generator 1020) is by cable 1025 which branches at terminal 1041 to the Variable Voltage Transformer 1050 and to the input motor 1009.

FIG. 10D shows a two speed converters 1043, 1044 embodiment 1004 comprising Hummingbird 1043 and Kingfisher-M 1044 control. Variable electric voltage input from a harnessing module/generator combination (not shown) is input by a flexible electric cable 1025A, for example, to a land module comprising an input motor 1035 via lead 1025B. Input motor 1035 has a motor shaft 1052 that is connected to a dual ring gear Hummingbird 1043 and to a Kingfisher-M 1044. The Kingfisher-M 1044 receives generator rotational speed input via sun gear 1077 of generator 1090 shaft 1091 as a feedback signal. Second sun gear 1077 of generator shaft 1091 is meshed with gear/disc/sleeve/sun gear 1078 of Kingfisher-M 1044. Right sun gear/sleeve/sun disc 1078 meshes with a planetary gear of a carrier gear assembly 1079 having a second planetary gear meshed with left sun gear/sleeve/sun disc 1076. Left sun disc 1076 meshes with second sun gear 1075 of control motor 1070 shaft 1072. Carrier gear assembly 1079 meshes with connecting gear 1083 which in turn is meshed with sun gear 1081 of variable voltage transformer 1085 shaft 1084. Via split electrical input 1025C, variable voltage is received at voltage regulator 1028 which connects via lead 1082A to the variable voltage transformer 1085 at a core which is swept by brush 1088 to provide increasing/decreasing voltage via lead 1082B to control motor 1070. The variable voltage transformer 1085 receives a feedforward signal from voltage regulator 1028. A control motor 1070 provides a control motor rotational speed input via a control motor shaft 1072 having sun gears 1075, 1054, first sun gear 1054 of control motor shaft 1072 connecting to the first ring gear 1056 meshes with carrier gear assembly 1058 meshed in turn with sleeve/sun gear 1061 and second sun gear/sleeve 1062 of the Hummingbird 1043 and second sun gear 1075 of control motor shaft 1072 connects to the input sun disc/sleeve/sun gear 1076 of the Kingfisher-M 1044. Second ring gear 1053 meshes with carrier 1064 which meshes in turn with sun gear/sleeve/sun disc 1065 via sun gear 1066 of shaft 1091 to generator 1090 and micro-grid 1095.

FIG. 11 shows the concept 1100 of a "generator equivalent" 1120 which may be combined with a "motor equivalent" 1110. A variable load condition causing variable rotational speed may be sensed at the "generator equivalent" to assure constant electrical frequency via feedback control at a "motor equivalent" 1100/"generator equivalent" 1120 combination. On the other hand, feedforward control is provided when variable power generated by a harnessing module/generator "motor equivalent" converts the variable power to constant mechanical speed for operating a generator or generator equivalent 1120 at constant speed (from feedforward control) and the "generator equivalent" 1120 at constant electrical frequency (from feedback control).

FIG. 12 shows the concept 1200 of harnessing more than rated power of a control motor 1270 at a minimum rotational speed. Variable flow 1205 of wind or water renewable energy and direction is captured by a harnessing module 1210 (unnumbered propeller or waterwheel and generator 1220) at variable rotational speed responsive to the variable (wind or water) flow 1205 and direction. A variable electrical output power is fed to input motor 1235 via terminals 1241, 1242. Terminal 1242 provides a feedforward signal equivalent to the output of generator 1220 to power comparator 1272 for comparison with (micro-grid) variable grid load 1204 power feedback to the comparator 1272. A control signal results from comparator 1272 which operates control motor 1270 to vary the overlap of variable overlap generator 1285 rotor and stator so that the variable overlap generator 1285 output matches the (micro-grid) variable grid load 1204. At terminal 1241, generator 1220 power is also fed to voltage regulator 1230 and variable voltage transformer 1286. Variable voltage transformer 1286 provides a voltage for operating control motor 1270 and a mechanical rotational speed output to spur/helical gear assembly (Transgear) 1245. The control motor 1270 has a shaft and a first sun gear of the control motor shaft provides a control mechanical speed input to the first ring gear assembly of Hummingbird two ring gear speed converter 1240 and the second sun gear of the control motor shaft receives a feedback signal from the spur/helical gear assembly (Transgear) 1245 received at the Transgear assembly 1245 from variable overlap generator 1285. The second ring gear carrier gear assembly of the Hummingbird two ring gear speed converter 1240 drives the variable overlap generator 1285 shaft. Consequently, the variable overlap generator 1285 may harness more than the rated power to the (micro-grid) variable grid load 1204 at minimum speed. Further embodiments of inventive concepts are shown in FIGS. 13, 14 and 15 respectively.

FIGS. 13A, 13B and 13C shows a current known generator having three poles per FIG. 113A may lead to a known generator per FIG. 13B having six poles times four or twenty-four poles per FIG. 13C showing that four sets of six poles 1310-1, 1310-2, 1310-3 and 1310-4 may be added axially to a generator shaft 1305 (or, in an exaggerated cade, three poles times twenty or sixty poles having an increased diameter may be replaced by a small diameter set of, for example, four generators in line, each having fifteen poles or sixty poles equivalent to the large diameter sixty pole generator). A wide diameter generator per FIG. 13B may be replaced by an axial line of sets of poles equivalent to the wide generator of FIG. 13B as per FIG. 13C.

FIG. 14 shows six different embodiments of harnessing modules in combinations or for various uses where the first of six concepts ((1) Non-renewable application) is a usage of a speed/voltage converter for automotive transmissions, HVAC compressor controls and various power-take-off (PTO) applications. The second of six concepts ((2) Wind turbines (HAWTs)) is used in HAWTs (horizontal wind turbines). A set of multiple generators in series, each with a set of poles may provide a sleek series/axially connected set of equivalent capacity to a single generator having the same number of poles (see FIG. 13B compared with FIG. 13C). The third concept ((3) Wind turbines) is used in VAWTs (vertical wind turbines) where one is shown with a fixed hatch and multiple generators (multiple gens) connected vertically. The fourth concept ((4) Tidal Turbines) is used in tidal turbines where the multiple harnessing modules are in parallel. A developed water inlet has a bi-directional tide flow from high to low tide and from low to high tide twice a day. A top view shows three harnessing modules which may receive water flow from either direction of water. If the tidal stream permits, the three (or more) harnessing modules may be placed in series along the tidal stream (not shown). In an ocean wave turbine fifth concept ((5) Wave Turbines), a honeycomb of, for example, twenty wave turbines may harness energy from waves in multiple directions. A sixth concept ((6) Ocean Current (OC) Turbines) is for use in river or ocean current turbines where ocean current flow is shown in one direction to three harnessing modules in parallel crossing the river or ocean current. Electrical power harnessed by each harnessing module of concepts (2) through (6) may be transmitted to a power collection module by an electrical cable and/or concepts (4) and (6) may be connected in series along a tidal stream, river or ocean current.

FIG. 15 shows the concept of providing various electrical inputs from, for example, renewable energy sources 1511 (River Turbines), 1512 (Tidal Turbines), 1513 (Wave Turbines), 1514 (Ocean Current Turbines), 1515 (HAWT), 1516 (VAWT), 1517 (Solar Panels) and other electrical energy sources may be combined at a power collection module 1530 or selectively switched as electrical inputs fed by electrical cable 1540 and/or fed to one or more control and generating (C&G) modules 1550 to an electric grid 1590 having constant or varying load. Samples are considered having three variables and different "Hummingbird" and "Kingfisher" varieties of simpler and more complex forms constructed and tested. These Hummingbird/Kingfisher control varieties of variable to constant frequency and voltage control all provide mechanical synchronization of variable input to constant output and efficient mechanical control of speed, for example, operating at a multiple of 50 Hz (European) or 60 Hz (US) to generate constant voltage and constant power at constant alternating current frequency and the like.

The principles of application of the several discussed embodiments of a structure and method of constructing same for, for example, providing a green renewable energy alternative to the burning of fuel such as coal, oil or other less environmentally friendly energy sources have been demonstrated above comprising a harnessing module specially designed and located to produce at least a predetermined value of harnessed renewable energy to produce a constant baseload amount of power to a load. A controlling module may use a pair of spur/helical gear assemblies of sun gears and planetary gears and a pair of ring gear and carrier gear assemblies for output and a spur/helical gear assembly constructed as a three variable control of variable rotational speed (a Hummingbird/Transgear assembly) and an accompanying control motor or control assembly used to convert rotational harnessing module speed variation to constant frequency, for example, for use in a river, ocean or tidal MHK turbine electric power generator or a propeller-driven variable wind flow turbine. The present embodiments used in conjunction with known flow energy turbine systems may be enhanced by using many known control systems for improved operation such as pitch and yaw control in wind turbines which are adaptable for use as propeller-driven river turbine harnessing modules, control responsive to power grid statistics and requirements and remote or automatic control responsive to predicted and actual weather conditions (river velocity from weather forecasts, an anemometer, water flow velocity from a water flow velocity meter, torque control via a torque meter, barometric reading and direction (rising or falling) and the like). A three variable to constant speed converter may be of the Goldfinch or preferably a simplified Hummingbird type and include a constant speed motor for controlling the output speed at a constant (constant frequency in Hertz) along with use of a variable power generator in certain of these embodiments. Besides river and tidal water energy uses, applications of a Hummingbird control may also be found in the fields of combustion or electric vehicle transmissions or boats, HVAC pumps and compressors and wind turbines. These and other features of embodiments and aspects of a variable energy flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A control and power generating assembly for controlling variable rotational speed input such that an output of the control and power generating assembly provides a constant speed output to a variable load from the variable rotational speed input, the control assembly for outputting a baseload value of electric energy to the variable load at a constant electric frequency, the control and power generating assembly comprising:

an input shaft for connecting a first and a second ring gear and carrier gear assembly through a spur/helical gear assembly, the input shaft for receiving a variable rotational input speed received from an energy harnessing module responsive to one of an input wind and water flow speed and direction, the second ring and carrier gear assembly of the first and second ring and carrier gear assembly and the spur/helical gear assembly connected to a generator shaft of a first generator, the first generator for receiving a control rotational speed input from a control motor connected to the first and second ring gear and carrier gear assembly by a first sun gear of a control shaft of the control motor, a control rotational speed output of the spur/helical gear assembly by a second sun gear of the control shaft of the control motor controlling the control rotational speed input to the control motor, a constant rotational speed output of the second ring and carrier gear assembly to the first generator, the control motor for receiving an electrical control signal from a series-connected voltage regulator and a variable voltage transformer, the control motor, voltage regulator and variable voltage transformer for controlling a rotational speed of a generator shaft of an output generator to a constant rotational speed via a feedback rotational speed received from the first generator by the spur/helical gear assembly, and the output generator outputting the baseload value of electric energy at the constant electric frequency to the variable load.

2. The control and power generating assembly of claim 1:

the first generator further comprising a control generator having a control generator shaft connected to first and second carrier gears of the first and second ring and carrier gear assemblies by first and second sun gears of the control generator shaft, the control generator outputing an electrical rotational speed control signal from the series-connected voltage regulator and variable voltage transformer.

3. The control and power generating assembly of claim 1 further comprising:

an input generator for outputting an electrical signal responsive to the variable rotational input speed received from the energy harnessing module to the voltage regulator and variable voltage transformer, the input generator for providing a feedforward electrical control signal to the voltage regulator and variable voltage transformer and for providing an electrical signal for powering an input motor for rotating the input shaft connecting the first and second ring gear and carrier gear assemblies the input motor replacing the first generator for receiving a variable electric power signal from the input generator, the input motor being connected to the input shaft.

4. The control and power generating assembly of claim 1 further comprising:

first and second electrical input leads from a second generator, the second generator being mechanically connected to the energy harnessing module, the second generator for converting the received variable rotational input speed of the energy harnessing module to a variable electrical input to the first and second electrical input leads, the first electrical input lead providing a feedforward electrical signal to the voltage regulator and the variable voltage regulator, the second electrical input lead providing the variable electrical input to an input motor, and the input motor for turning the input shaft for connecting the first and second ring gear and carrier gear assemblies through the spur/helical gear assembly.

5. The control and power generating assembly of claim 1 further comprising:

a mechanical rotational speed input from the energy harnessing module connected mechanically to the input shaft.

6. The control and power generating assembly of claim 5 further comprising;

the energy harnessing module receiving a variable flow and direction of renewable energy comprising one of wind and water flow.

7. The control and power generating assembly of claim 1, the output generator being connected to a variable load of an electric grid and providing the feedback rotational speed to the spur/helical gear assembly.

8. A control and power generating assembly for controlling variable rotational speed input such that an output of the control assembly provides a constant speed output from the variable rotational speed input, the control assembly for outputting a baseload value of electric power to a variable load at a constant electric frequency, the control and power generating assembly comprising:
a voltage regulator and a central processing unit for receiving an electrical input signal from an energy harnessing module connected to a generator, the energy harnessing module responsive to one of a variable input wind and water flow speed and direction,
the generator for outputting the electrical input signal to the voltage regulator and the central processing unit and to a variable voltage transformer,
a control motor for receiving an electrical control signal from the voltage regulator and the central processing unit and for outputting a rotational speed output to a shaft of the variable voltage transformer,
the variable voltage transformer for receiving the electrical input signal from the generator connected to the energy harnessing module and for outputting a regulated electrical output signal of the variable voltage transformer to a motor and generator set for outputting the baseload value of electric power at the constant electrical frequency to the variable load,
the baseload value of electric power at the constant electrical frequency being a feedback voltage signal to the voltage regulator and the central processing unit, the central processing unit for comparing the feedback voltage signal and the electrical input signal from the energy harnessing module connected to the generator, the electrical input signal from the energy harnessing module connected to the generator being a feedforward signal to the voltage regulator and the central processing unit.

9. The control and power generating assembly of claim 8 further comprising:
an input motor for receiving the electrical input signal from the energy harnessing module connected to the generator, the energy harnessing module responsive to one of the variable input wind and water flow speed and direction, the input motor for outputting a rotational speed output via a spur/helical gear assembly to the generator,
the spur/helical gear assembly, responsive to the rotational speed output of the input motor, the variable load and the control motor, for controlling the baseload value of electric power to the variable load,
the voltage regulator and the central processing unit being replaced by a direct electrical connection of the variable voltage transformer to the energy harnessing module connected to the generator,
the input motor, the spur/helical gear assembly and the generator comprising a motor equivalent and a generator equivalent set for outputting the baseload value of electric power to the variable load at the constant electric frequency.

10. The control and power generator of claim of claim 9, a generator of the motor and generator set being mechanically controlled by the spur/helical gear assembly to output the baseload value of electric power to the variable load at the constant electric frequency.

11. The control and power generating assembly of claim 8 further comprising:
the energy harnessing module for receiving a variable flow and direction of renewable energy comprising one of wind and water flow.

12. The control and power generating assembly of claim 11 further comprising:
the energy harnessing module comprising a variable speed concentric wing assembly for receiving the one of wind and water flow.

13. The control and power generator assembly of claim 8, the variable voltage transformer comprising a shaft wherein the control motor comprises a servo motor for actuating the shaft of the variable voltage transformer.

14. The control and power generator assembly of claim 8, the variable voltage transformer comprising an output electric power lead to the motor and generator set, the motor and generator set for outputting electric power to the variable load.

15. The control and power generating assembly of claim 14 further comprising:
the energy harnessing module and generator comprising a renewable energy harnessing module and generator, the renewable energy harnessing module for receiving a variable flow and direction of renewable energy comprising one of wind and water flow.

16. A control and power generating assembly for controlling variable rotational speed input such that an output of the control and power generating assembly provides a constant speed output from the variable rotational speed input, the control assembly for outputting a predetermined value of electric energy to a variable load at a constant electric frequency, the control and power generating assembly comprising:
an input motor having an input shaft for connecting a first and a second ring gear and carrier gear assembly through a spur/helical gear assembly, the input shaft for receiving a variable rotational input speed received from the input motor via an energy harnessing module connected to a generator responsive to one of an input wind and water flow speed and direction,
the second ring and carrier gear assembly of the first and second ring and carrier gear assemblies and the spur/helical gear assembly connected to a generator shaft of an output generator,
the output generator for converting a control rotational speed input of a control motor connected to the first and the second ring gear and carrier gear assembly by a first sun gear of a control shaft of the control motor and a control rotational speed output of the spur/helical gear assembly by a second sun gear of the control shaft of the control motor to a constant rotational speed output of the second ring and carrier gear assembly to the output generator,
the control motor for receiving an electrical control signal from a series-connected voltage regulator and a variable voltage transformer,
the control motor, voltage regulator and variable voltage transformer for controlling a rotational speed of the generator shaft of the output generator to a constant rotational speed via a feedback rotational speed received from the output generator by the spur/helical gear assembly.

17. The control and power generating assembly of claim 16 further comprising:
the output generator comprising a variable overlap generator connected to the variable load and driven by the output generator shaft, the variable overlap generator receiving a control input of a servo motor for regulating a position of an overlap of a rotor with a stator connected to the output generator shaft of the output generator, the servo motor receiving a comparison control signal from a power comparator for comparing a variable power of the variable load to an electrical input from the harnessing module connected to the generator as a feedforward control signal.

\* \* \* \* \*